(12) United States Patent
Su et al.

(10) Patent No.: US 12,137,398 B2
(45) Date of Patent: Nov. 5, 2024

(54) FEEDBACK CHANNEL SENDING METHOD AND APPARATUS, AND FEEDBACK CHANNEL RECEIVING METHOD AND APPARATUS

(71) Applicant: HUAWEI TECHNOLOGIES CO., LTD., Guangdong (CN)

(72) Inventors: Hongjia Su, Shanghai (CN); Jinfang Zhang, Shenzhen (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 17/363,425

(22) Filed: Jun. 30, 2021

(65) Prior Publication Data

US 2021/0329431 A1  Oct. 21, 2021

Related U.S. Application Data

(63) Continuation of application No. PCT/CN2020/071293, filed on Jan. 10, 2020.

(30) Foreign Application Priority Data

Jan. 11, 2019 (CN) .......................... 201910028002.4
Aug. 14, 2019 (CN) .......................... 201910749320.X

(51) Int. Cl.
 *H04W 4/40* (2018.01)
 *H04L 5/00* (2006.01)
 (Continued)

(52) U.S. Cl.
 CPC .............. *H04W 4/40* (2018.02); *H04L 5/0094* (2013.01); *H04W 72/23* (2023.01); *H04L 1/0038* (2013.01); *H04W 92/18* (2013.01)

(58) Field of Classification Search
 None
 See application file for complete search history.

(56) References Cited

U.S. PATENT DOCUMENTS 11,516,692 B2 * 11/2022 Lee .................... H04W 64/00
2017/0019886 A1 * 1/2017 Patel .................... H04W 72/23
(Continued)

FOREIGN PATENT DOCUMENTS

CN          104486049 A      4/2015
CN          105813204 A      7/2016
(Continued)

OTHER PUBLICATIONS

3GPP TS 38.213 V15.3.0 (Sep. 2018), "3rd Generation Partnership Project; Technical Specification Group Radio Access Network; NR; Physical layer procedures for control(Release 15)," Sep. 2018, 101 pages.

(Continued)

*Primary Examiner* — Andrew C Oh
(74) *Attorney, Agent, or Firm* — Fish & Richardson P.C.

(57) ABSTRACT

The present disclosure relates to feedback channel sending methods. In one example method, a first terminal device obtains configuration information of a resource pool, where the configuration information is used to indicate that frequency domain resources of the resource pool include L sub-channels and each sub-channel includes q resource blocks (RBs), M of the L sub-channels are used by the first terminal device to send at least one of a physical sidelink control channel (PSCCH) or a physical sidelink shared channel (PSSCH), N of the L sub-channels are used by the first terminal device to receive a physical sidelink feedback channel (PSFCH) from a second terminal device, and there is a correspondence between one of the M sub-channels and one of N·q RBs included in the N sub-channels, and sends (Continued)

at least one of a first PSCCH or a first PSSCH on a first channel in a slot n.

20 Claims, 12 Drawing Sheets

(51) Int. Cl.
*H04W 72/23* (2023.01)
*H04L 1/00* (2006.01)
*H04W 92/18* (2009.01)

(56) References Cited

U.S. PATENT DOCUMENTS

| | | | |
|---|---|---|---|
| 2017/0034688 A1* | 2/2017 | Kim | G01S 5/26 |
| 2019/0053267 A1* | 2/2019 | Kim | H04W 76/14 |
| 2019/0387377 A1* | 12/2019 | Zhang | H04W 52/383 |
| 2020/0260413 A1* | 8/2020 | Hong | H04L 5/0078 |
| 2022/0039080 A1* | 2/2022 | Khoryaev | H04W 4/40 |
| 2022/0124562 A1* | 4/2022 | Yu | H04W 72/20 |

FOREIGN PATENT DOCUMENTS

| | | | | |
|---|---|---|---|---|
| CN | 106304351 A | 1/2017 | | |
| CN | 106793092 A | 5/2017 | | |
| CN | 107277922 A | 10/2017 | | |
| CN | 109121209 A | 1/2019 | | |
| CN | 109644455 A * | 4/2019 | | H04B 7/0626 |
| CN | 109891981 A * | 6/2019 | | H04L 5/0044 |
| CN | 105813204 B * | 5/2020 | | H04L 1/1861 |
| CN | 111200487 A * | 5/2020 | | H04L 1/1607 |
| CN | 111342941 A * | 6/2020 | | H04L 1/0004 |
| CN | 113273120 A * | 8/2021 | | H04L 5/0044 |
| WO | 2017049938 A1 | 3/2017 | | |
| WO | 2017116108 A1 | 7/2017 | | |
| WO | WO-2017126266 A1 * | 7/2017 | | H04L 67/12 |
| WO | 2018151637 A1 | 8/2018 | | |
| WO | WO-2020088267 A1 * | 5/2020 | | H04L 1/1607 |
| WO | WO-2020093335 A1 * | 5/2020 | | H04W 4/40 |
| WO | WO-2020136838 A1 * | 7/2020 | | H04L 1/0067 |
| WO | WO-2020142987 A1 * | 7/2020 | | |
| WO | WO-2020142991 A1 * | 7/2020 | | H04L 1/1607 |

OTHER PUBLICATIONS

3GPP TS 38.214 V15.3.0 (Sep. 2018), 3rd Generation Partnership Project; Technical Specification Group Radio Access Network; NR; Physical layer procedures for data (Release 15), Sep. 2018, 96 pages.

3GPP TS 38.331 V15.3.0 (Sep. 2018), 3rd Generation Partnership Project; Technical Specification Group Radio Access Network; NR; Radio Resource Control (RRC) protocol specification(Release 15), Sep. 2018, 445 pages.

PCT International Search Report and Written Opinion issued in International Application No. PCT/CN2020/071293 on Apr. 9, 2020, 11 pages (partial English translation).

Extended European Search Report issued in European Application No. 20738953.7 on Dec. 17, 2021, 13 pages.

MediaTek Inc., "Discussion on physical layer structure for NR sidelink," 3GPP TSG RAN WG1 Meeting #95, R1-1812364, Spokane, US, Nov. 12-16, 2018, 10 pages.

Qualcomm Incorporated, "Considerations on Physical Layer aspects of NR V2X," 3GPP TSG RAN WG1 Meeting #95, R1-1813421, Spokane, USA, Nov. 12-16, 2018, 16 pages.

Huawei, HiSilicon, "Sidelink PHY structure and procedure for NR V2X," 3GPP TSG RAN WG1 Meeting #94bis, R1-1810138, Chengdu, China, Oct. 8-12, 2018, 15 pages.

MediaTek Inc., "On sidelink physical layer structure," 3GPP TSG RAN WG1 Ad-Hoc Meeting 1901, R1-1900196, Taipei, Taiwan, Jan. 21-25, 2019, 10 pages.

Office Action issued in Chinese Application No. 201910749320.X on Jun. 9, 2021, 6 pages.

Vivo, "Physical layer procedure for NR sidelink," 3GPP TSG RAN WG1 Meeting #95, R1-1812307, Spokane, USA, Nov. 12-16, 2018, 7 pages.

* cited by examiner

FEEDBACK CHANNEL SENDING METHOD AND APPARATUS, AND FEEDBACK CHANNEL RECEIVING METHOD AND APPARATUS

CROSS-REFERENCE TO RELATED APPLICATIONS

This application is a continuation of International Application No. PCT/CN2020/071293, filed on Jan. 10, 2020, which claims priority to Chinese Patent Application No. 201910028002.4, filed on Jan. 11, 2019 and Chinese Patent Application No. 201910749320.X, filed on Aug. 14, 2019. All of the aforementioned patent applications are hereby incorporated by reference in their entireties.

TECHNICAL FIELD

This application relates to the vehicle-to-everything field, and more specifically, to a feedback channel sending method and apparatus, and a feedback channel receiving method and apparatus.

BACKGROUND

Vehicle-to-everything (V2X) communication means communication between a vehicle and anything outside the vehicle, for example, communication between the vehicle and a vehicle, communication between the vehicle and a pedestrian, communication between the vehicle and an infrastructure, and communication between the vehicle and a network. Based on a V2X technology, vehicle-user equipment (V-UE) can send, to a surrounding V-UE, some pieces of information of the vehicle-user equipment, such as a location, a speed, and an intent (turning, merging, reversing, or the like). The V-UE also receives information of the surrounding V-UE in real time.

With development of a new radio (NR) technology in a 3rd generation partnership project (3GPP) standard organization, NR V2X will further develop, for example, support lower transmission latency, more reliable communication transmission, a higher throughput, and better user experience, to satisfy requirements of more extensive application scenarios. In the NR V2X, to ensure communication quality (including latency, reliability, a throughput, spectral efficiency, and the like) of physical layer unicast and groupcast, a physical sidelink feedback channel (PSFCH) is introduced based on an existing physical sidelink control channel (PSCCH) and physical sidelink shared channel (PSSCH). The PSFCH will be used to carry sidelink feedback control information (SFCI), including a sidelink hybrid automatic repeat request (HARQ), sidelink channel state information (CSI), and/or the like.

If the V-UE sends and receives a PSFCH through a PSSCH, because the PSSCH is scheduled and sent by using a PSCCH, it means that the PSFCH also needs to be scheduled by using the PSCCH. Consequently, information carried on the PSCCH and formats of control information are increased, air interface signaling overheads are relatively large, and complexity increases. If the V-UE sends and receives the PSFCH through the PSCCH, the PSCCH needs to be received by the V-UE through blind decoding. Consequently, the complexity is relatively high. For V2X under base station-scheduling mode, the PSFCH also needs to be scheduled by a base station. Consequently, air interface signaling overheads and the complexity are increased. For V2X under V-UE autonomous resource selection mode, if the V-UE autonomously selects a resource for sending a PSFCH and a resource for receiving a PSFCH, a collision may occur between a PSFCH resource and a PSCCH resource. Consequently, V2X communication reliability is reduced.

SUMMARY

This application provides a feedback channel sending method and a feedback channel receiving method, to reduce receiving complexity of a PSFCH, reduce signaling overheads for sending and receiving the PSFCH, and improve reliability of V2X communication.

According to a first aspect, this application provides a feedback channel receiving method. The method includes: A first terminal device obtains configuration information of a sidelink resource pool, where the sidelink resource pool is used for sidelink communication between the first terminal device and a second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q≥M, and L, M, N, and q are all integers greater than or equal to 1. The first terminal device sends a first PSCCH and/or a first PSSCH on a first channel in a slot n, where the first channel includes one or more of the M sub-channels. The first terminal device determines, based on the correspondence and the first channel, a first RB on which a first PSFCH sent by the second terminal device for the first PSCCH and/or the first PSSCH is received from the second terminal device, where the first RB belongs to the N·q RBs included in the N sub-channels. The first terminal device receives the first PSFCH from the second terminal device on the first RB in a slot n+k, where n≥0, k≥1, and both n and k are integers.

In the technical solution of this application, a network device divides the L sub-channels included in the frequency domain resources in the sidelink resource pool into two parts: the M sub-channels used by the first terminal device to send the PSCCH and/or the PSSCH, and the N sub-channels used by the first terminal device to receive the PSFCH. In addition, the correspondence between the M sub-channels and the N·q RBs included in the N sub-channels is defined, so that the network device does not need to perform scheduling when the first terminal device (namely, a transmit end) performing sidelink communication receives the PSFCH or the second terminal device (namely, a receive end) sends the PSFCH. In addition, a resource does not need to be autonomously selected based on some specific conditions (for example, channel listening). Therefore, complexity of implementing sidelink communication between two parties in SL communication can be reduced. In addition, the first terminal device (transmit end) and the second terminal device (receive end) that perform sidelink communication may determine, without a need to indicate any feedback resource, a location of a resource for receiving or sending the PSFCH, thereby reducing air interface signaling overheads. Further, in an autonomous resource selection mode of a user, a collision between a resource autonomously selected by the user for sending the PSFCF and a resource selected by another user for sending the PSCCH or the PSSCH is avoided, thereby improving reliability of V2X communication.

In a possible design, that the first terminal device sends a first PSCCH and/or a first PSSCH on a first channel includes: The first terminal device sends the first PSCCH and/or the first PSSCH on the first channel scheduled by a network device; or the first terminal device autonomously selects to send the first PSCCH and/or the first PSSCH on the first channel.

The first terminal device may send the PSCCH and/or the PSSCH on the sub-channel scheduled by the network device or the autonomously selected sub-channel, thereby improving flexibility of V2 communication.

In a possible design, L, q, M, and N satisfy $N=\lceil L/(1+q) \rceil$, where $L=M+N$, and $\lceil \ \rceil$ represents rounding up.

By designing a relational expression satisfied by L, q, M, and N, the L sub-channels included in the frequency domain resources of the resource pool may be divided into two parts: the M sub-channels used to send the PSCCH and/or the PSSCH, and the N sub-channels used to receive the PSFCH. Therefore, the L sub-channels in the resource pool may be properly allocated. In addition, division of the L sub-channels into the two parts may be considered that the M sub-channels used to send the PSCCH and/or the PSSCH and the N sub-channels used to send the PSFCH are clearly defined. In this case, the terminal device may be prevented from blindly sending the PSFCH on the L sub-channels, to avoid a resource collision between the terminal device sending the PSFCH and another terminal device sending a PSCCH and/or a PSSCH on the L sub-channels. Therefore, according to the design in this embodiment, the terminal device sends the PSFCH only on the N sub-channels used to send the PSFCH, so that a probability of resource collision can be reduced. Further, the L sub-channels are divided into two parts, so that a range of blind decoding performed on the PSCCH by the receive end performing SL communication can be narrowed. That is, the receive end needs to blind decode the M sub-channels instead of blind decoding all the L sub-channels. Therefore, blind decoding complexity can be reduced.

In a possible design, that there is a correspondence between one of the M sub-channels and one of N·q RBs included in the N sub-channels includes: An $m^{th}$ sub-channel in the M sub-channels is corresponding to an $m^{th}$ RB in the N·q RBs included in the N sub-channels, where $1 \leq m \leq M$, and m is an integer.

A one-to-one mapping correspondence is established between the M sub-channels and the N·q RBs included in the N sub-channels in an index sequence, to reduce design complexity of the correspondence between the M sub-channels and the N·q RBs included in the N sub-channels.

In a possible design, the method further includes: The first terminal device sends a second PSCCH on a second RB, where the second PSCCH is not used to schedule a PSSCH, or the second PSCCH and a corresponding PSSCH are located in different slots, and the second RB is an RB that is in the N·q RBs included in the N sub-channels and that is other than an RB corresponding to one of the M sub-channels.

A feature of the second PSCCH is considered. To be specific, the second PSCCH may not be used to schedule the PSSCH, or even if the second PSCCH is used to schedule the PSSCH, the second PSCCH and the scheduled PSSCH are located in different slots. Therefore, the network device needs to configure only a resource used by the transmit end to send the second PSCCH, and does not need to configure a resource for the PSFCH of the second PSSCH. Therefore, the second PSCCH is sent on an RB that is in the N·q RBs included in the N sub-channels and that is other than an RB corresponding to one of the M sub-channels. A requirement of sending the second PSCCH by the transmit end is satisfied. In addition, remaining frequency domain resources in the resource pool can be fully used, thereby avoiding a waste of resources.

In a possible design, that the first terminal device sends a first PSCCH and/or a first PSSCH on a first channel in a slot n includes: The first terminal device determines an index of a second channel on which the first PSCCH is located, where the second channel is one of one or more sub-channels included in the first channel. The first terminal device sends the first PSCCH to the second terminal device on the second channel.

In this embodiment, the second terminal device receives the first PSCCH through blind decoding only on the determined second channel, and does not need to perform blind decoding on all the M sub-channels, thereby reducing complexity of blind decoding.

In a possible design, the first terminal device determines that the index $n_{subCH}^{PSCCH}$ of the second channel on which the first PSCCH is located satisfies the following formula: $n_{subCH}^{PSCCH} = n_{subCH}^{start} + \lfloor (K_{subCH}-1)/2 \rfloor$, where $n_{subCH}^{start}$ is a start index of the one or more sub-channels included in the first channel, and $K_{subCH}$ is a quantity of the one or more sub-channels included in the first channel.

According to the formula for determining the index of the second channel provided in this application, in a design, the PSCCH may be in the middle of the PSSCH. In frequency domain, if a PSCCH of a V-UE is adjacent to only a PSSCH of the V-UE, and is not adjacent to a PSCCH or PSSCH of another V-UE, in-band leakage of another V-UE to the V-UE can be reduced. Therefore, transmission reliability of the PSCCH can be improved.

In a possible design, the configuration information includes a value of k, and the method further includes: The first terminal device determines the value of k based on the configuration information.

According to a second aspect, this application provides a feedback channel sending method. The method includes: A second terminal device obtains configuration information of a sidelink resource pool, where the sidelink resource pool is used for sidelink communication between a first terminal device and the second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q is greater than or equal to M, and L, M, N, and q are all integers greater than or equal to 1. The second terminal device receives a first PSCCH and/or a first PSSCH from the first terminal device on a first channel in a slot n, where the first channel includes one or more of the M sub-channels. The second terminal device determines, based on the correspondence and the first channel, a first RB on which a first PSFCH is sent for the first PSCCH and/or the first PSSCH, where the first RB belongs to the N·q RBs included in the N sub-channels. The second terminal device sends the first PSFCH to the first terminal device on the first RB in a slot n+k, where n≥0, k≥1, and both n and k are integers.

In a possible design, L, q, M, and N satisfy N=⌈L/(1+q)⌉, where L=M+N, and ⌈ ⌉ represents rounding up.

In a possible design, that there is a correspondence between one of the M sub-channels and one of N·q RBs included in the N sub-channels includes: An $m^{th}$ sub-channel in the M sub-channels is corresponding to an $m^{th}$ RB in the N·q RBs included in the N sub-channels, where 1≤m≤M, and m is an integer.

In a possible design, the method further includes: The second terminal device receives a second PSCCH from the first terminal device on a second RB, where the second PSCCH is not used to schedule a PSSCH, or the second PSCCH and a corresponding PSSCH are located in different slots, and the second RB is an RB that is in the N·q RBs included in the N sub-channels and that is other than an RB corresponding to one of the M sub-channels.

In a possible design, that the second terminal device receives a first PSCCH and/or a first PSSCH from the first terminal device on a first channel includes: The second terminal device determines an index of a second channel on which the first PSCCH is located, where the second channel is one of one or more sub-channels included in the first channel. The second terminal device receives the first PSCCH from the first terminal device on the second channel.

In a possible design, the second terminal device determines that the index $n_{subCH}^{PSCCH}$ of the second channel on which the first PSCCH is located satisfies the following formula: $n_{subCH}^{PSCCH} = n_{subCH}^{start} + \lfloor(K_{subCH}-1)/2\rfloor$, where $n_{subCH}^{start}$ is a start index of the one or more sub-channels included in the first channel, and $K_{subCH}$ is a quantity of the one or more sub-channels included in the first channel.

In a possible design, the second terminal device determines a value of k in the following manner: The second terminal device determines the value of k based on the configuration information, where the configuration information includes the value of k. Alternatively, the second terminal device determines the value of k based on the first PSCCH, where the first PSCCH carries information indicating the value of k.

It should be understood that, for beneficial effects that can be achieved by the method in the second aspect and any possible design of the method in the second aspect, refer to descriptions of the first aspect and various possible designs of the first aspect. Details are not described herein again.

According to a third aspect, this application provides a feedback channel receiving apparatus. The apparatus has a function of implementing the method in any one of the first aspect and the possible implementations of the first aspect. The function may be implemented by hardware, or may be implemented by hardware executing corresponding software. The hardware or the software includes one or more units corresponding to the foregoing function.

According to a fourth aspect, this application provides a feedback channel sending apparatus. The apparatus has a function of implementing the method in any one of the second aspect and the possible implementations of the second aspect. The function may be implemented by hardware, or may be implemented by hardware executing corresponding software. The hardware or the software includes one or more units corresponding to the foregoing function.

According to a fifth aspect, this application provides a terminal device, including a processor and a memory. The memory is configured to store a computer program, and the processor is configured to invoke and run the computer program stored in the memory, so that the terminal device performs the method in any one of the first aspect or the possible implementations of the first aspect.

According to a sixth aspect, this application further provides a terminal device, including a processor and a memory. The memory is configured to store a computer program, and the processor is configured to invoke and run the computer program stored in the memory, so that the terminal device performs the method in any one of the second aspect or the possible implementations of the second aspect.

According to a seventh aspect, this application further provides a PSCCH sending method. The method includes; A first terminal device obtains configuration information of a sidelink resource pool, where the sidelink resource pool is used for sidelink communication between the first terminal device and a second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to send a second PSCCH, and the second PSCCH is not used to schedule a PSSCH or the second PSCCH and a corresponding PSSCH are located in different slots, where L, M, and N are all integers greater than or equal to 1. The first terminal device sends the second PSCCH on one or more of the N sub-channels.

Here, the second PSCCH is a standalone PSCCH.

It should be noted that, in the first aspect, the N sub-channels in the L sub-channels are used to send the PSFCH. Further, when N·q>M, the second PSCCH is sent on a second RB in N·q RBs included in the N sub-channels. Different from the first aspect, in the eleventh aspect, the N sub-channels in the L sub-channels are used to send an independent PSCCH, and are not used to send the PSFCH.

According to an eighth aspect, this application provides a PSCCH receiving method. The method includes: A second terminal device obtains configuration information of a sidelink resource pool, where the sidelink resource pool is used for sidelink communication between the second terminal device and a first terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, and the N sub-channels are used by the first terminal device to send a second PSCCH, where L, M, and N are all integers greater than or equal to 1. The second terminal device blindly decodes the N sub-channels, and receives the second PSCCH from the first terminal device.

In the eighth aspect, when the N sub-channels in the L sub-channels are used by the first terminal device to send the second PSCCH, the second terminal device, used as a receive end for sidelink communication, receives the second PSCCH by blind decoding the N sub-channels.

In a possible design, the second PSCCH may occupy one or more of all RBs included in the N sub-channels. This is not limited in this application.

According to a ninth aspect, this application provides a physical sidelink control channel PSCCH sending method.

The method includes: A first terminal device obtains configuration information of a sidelink resource pool, where the sidelink resource pool is used for sidelink communication between the first terminal device and a second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q is greater than or equal to M, and L, M, N, and q are all integers greater than or equal to 1. The first terminal device sends a first PSCCH and/or a first PSSCH on a first channel, where the first channel includes one or more of the M sub-channels, the first PSCCH is located on a second channel, and the second channel is one of the one or more sub-channels included in the first channel, where an index of the second sub-channel satisfies a formula:

$$n_{subCH}^{PSCCH} = n_{subCH}^{start} + \lfloor (K_{subCH} - 1)/2 \rfloor,$$

where $n_{subCH}^{start}$ is a start index of the one or more sub-channels included in the first channel, and $K_{subCH}$ is a quantity of sub-channels included in the first channel.

In a possible design, the first terminal device sends a first PSCCH and/or a first PSSCH on a first channel includes: The first terminal device determines the index $n_{subCH}^{start}$ of the second channel. The first terminal device sends the first PSCCH on the second channel, and sends the first PSSCH on another sub-channel that is in the one or more sub-channels included in the first channel and that is other than the second channel.

According to a tenth aspect, this application provides a physical sidelink control channel PSCCH sending method. The method includes: A second terminal device obtains configuration information of a sidelink resource pool, where the sidelink resource pool is used for sidelink communication between a first terminal device and the second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q is greater than or equal to M, and L, M, N, and q are all integers greater than or equal to 1. The second terminal device determines an index of a second channel that needs to be blindly decoded, where the second channel carries a first PSCCH, the second channel is one of one or more sub-channels included in a first channel, the first channel includes one or more of the M sub-channels, and a first PSSCH is carried on another sub-channel that is in the one or more sub-channels included in the first channel and that is other than the second sub-channel, where an index of the second channel satisfies a formula:

$$n_{subCH}^{PSCCH} = n_{subCH}^{start} + \lfloor (K_{subCH} - 1)/2 \rfloor,$$

where $n_{subCH}^{start}$ is a start index of the one or more sub-channels included in the first channel, and $K_{subCH}$ is a quantity of sub-channels included in the first channel.

The second terminal device, used as a receive end for sidelink communication, calculates an index of a sub-channel that needs to be blindly decoded in the M sub-channels. The second terminal device blindly decodes the first PSCCH only on the determined second channel, and does not need to perform blind decoding on all the M sub-channels, thereby reducing complexity of blind decoding.

According to an eleventh aspect, this application provides a computer-readable storage medium. The computer-readable storage medium stores computer instructions. When the computer instructions are run on a computer, the computer is enabled to perform the method in any one of the first aspect or the possible designs of the first aspect, perform the method in any one of the seventh aspect or the possible designs of the seventh aspect, or perform the method in any one of the ninth aspect or the possible designs of the ninth aspect.

According to a twelfth aspect, this application provides a computer-readable storage medium. The computer-readable storage medium stores computer instructions. When the computer instructions are run on a computer, the computer is enabled to perform the method in any one of the second aspect or the possible designs of the second aspect, perform the method in any one of the eighth aspect or the possible designs of the eighth aspect, or perform the method in any one of the tenth aspect or the possible designs of the tenth aspect.

According to a thirteenth aspect, this application provides a chip, including a processor. The processor is configured to read and execute a computer program stored in a memory, to perform the method in any one of the first aspect or the possible designs of the first aspect, or perform the method in any one of the seventh aspect or the possible designs of the seventh aspect, or perform the method in any one of the ninth aspect or the possible designs of the ninth aspect.

Optionally, the chip further includes the memory, and the memory and the processor are connected to the memory through a circuit or a wire.

Further, optionally, the chip includes a communication interface.

According to a fourteenth aspect, this application provides a chip, including a processor. The processor is configured to read and execute a computer program stored in a memory, to perform the method in any one of the second aspect or the possible designs of the second aspect, or perform the method in any one of the eighth aspect or the possible designs of the eighth aspect, or perform the method in any one of the tenth aspect or the possible designs of the tenth aspect.

Optionally, the chip further includes the memory, and the memory and the processor are connected to the memory through a circuit or a wire.

Further, optionally, the chip includes a communication interface.

In the technical solutions provided in this application, the network device divides the L sub-channels included in the frequency domain resources in the sidelink resource pool into two parts: the M sub-channels used by the first terminal device to send the PSCCH and/or the PSSCH, and the N sub-channels used by the first terminal device to receive the PSFCH. In addition, the correspondence between the M sub-channels and the N·q RBs included in the N sub-channels is defined, so that the network device does not need to perform scheduling when the first terminal device (namely, the transmit end) performing sidelink communication receives the PSFCH or the second terminal device (namely, the receive end) sends the PSFCH. In addition, a resource does not need to be autonomously selected based on some specific conditions (for example, channel listening). Therefore, complexity of implementing sidelink communication between two parties in SL communication can be reduced.

Figure 3:
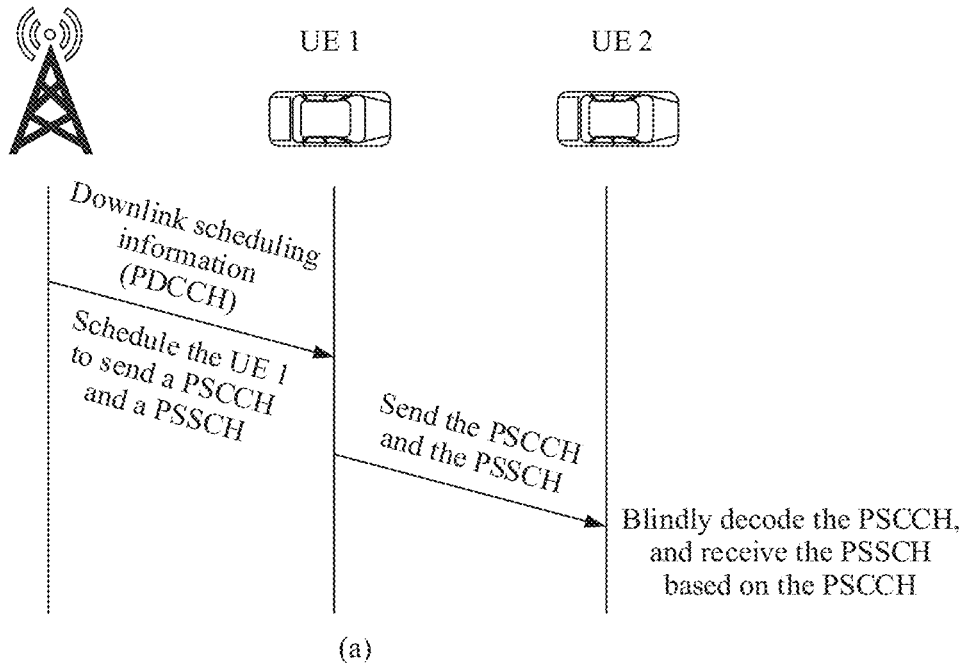
Figure 3:
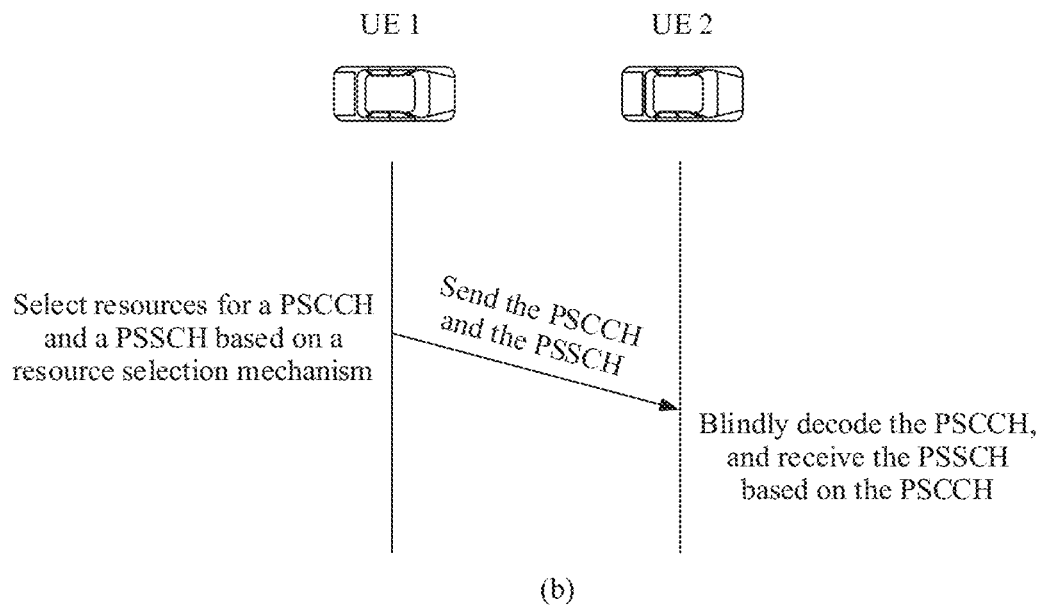
Figure 4:
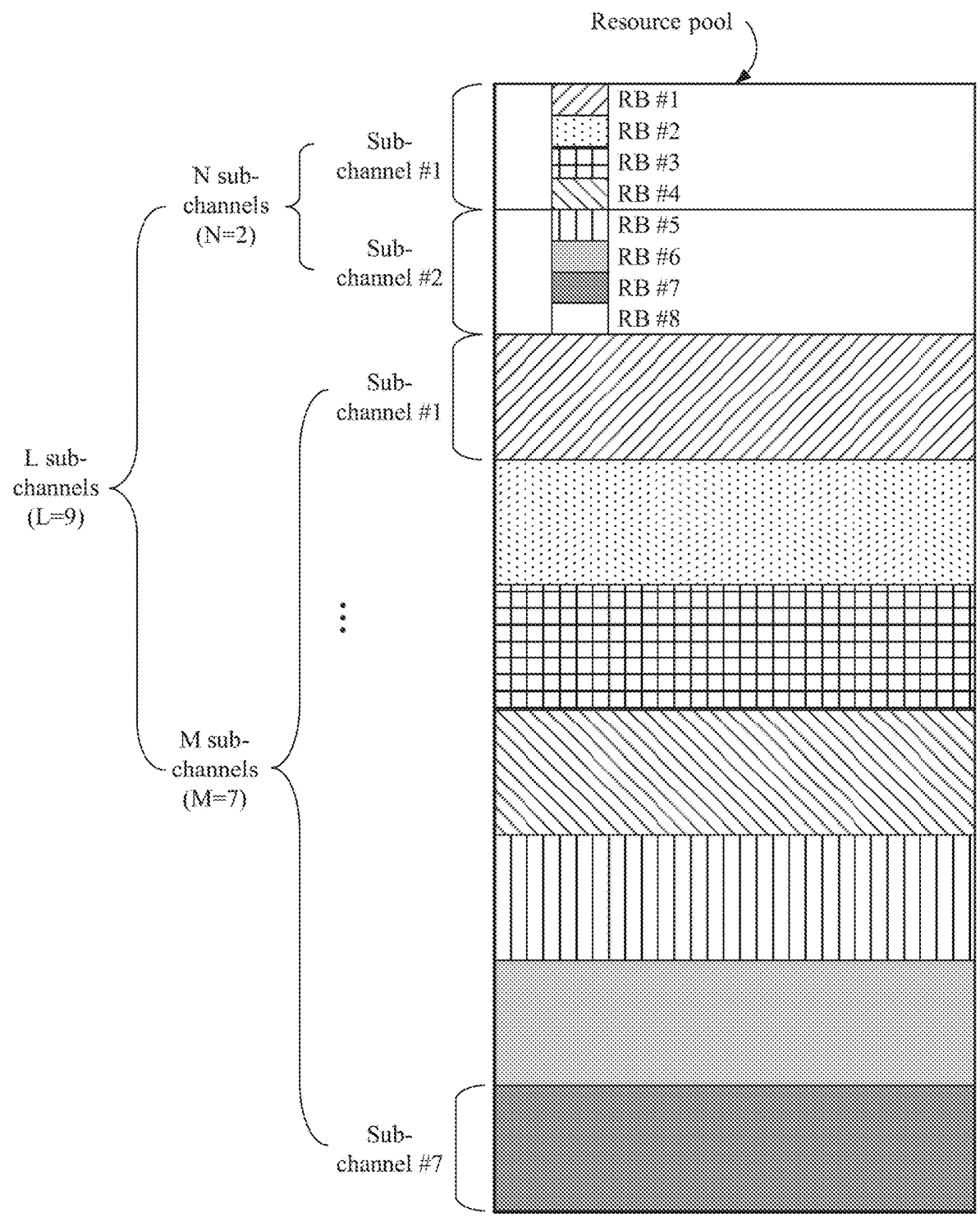
Figure 5:
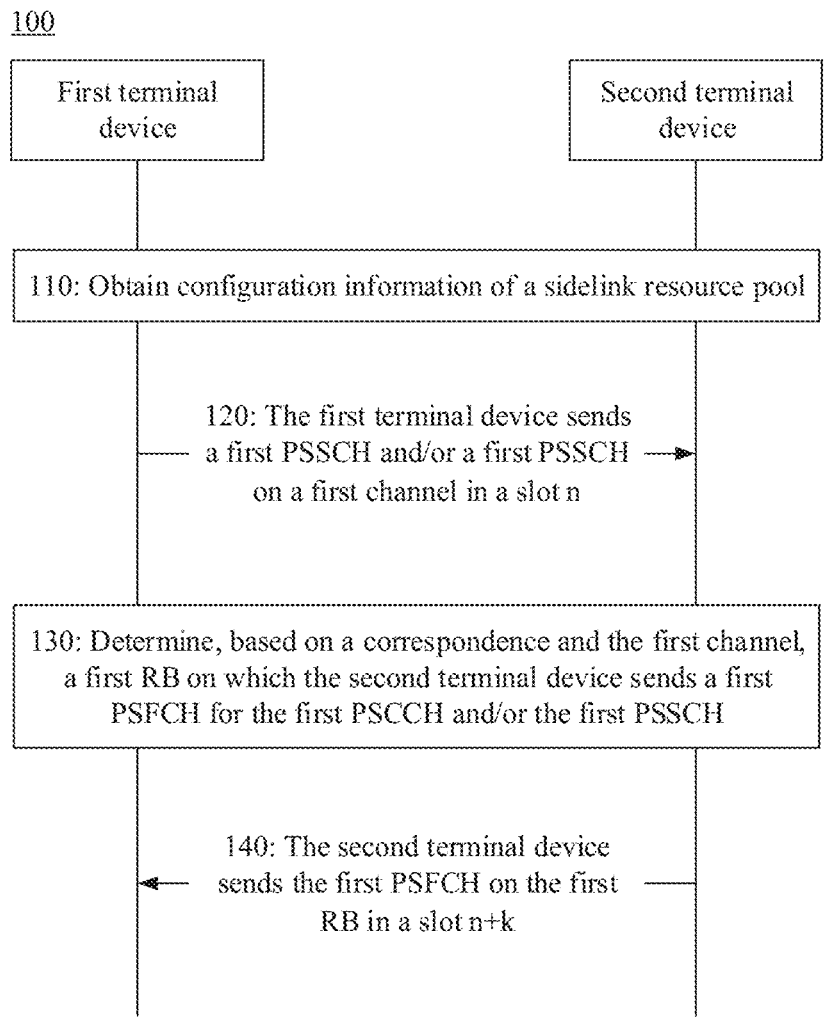
Figure 6:
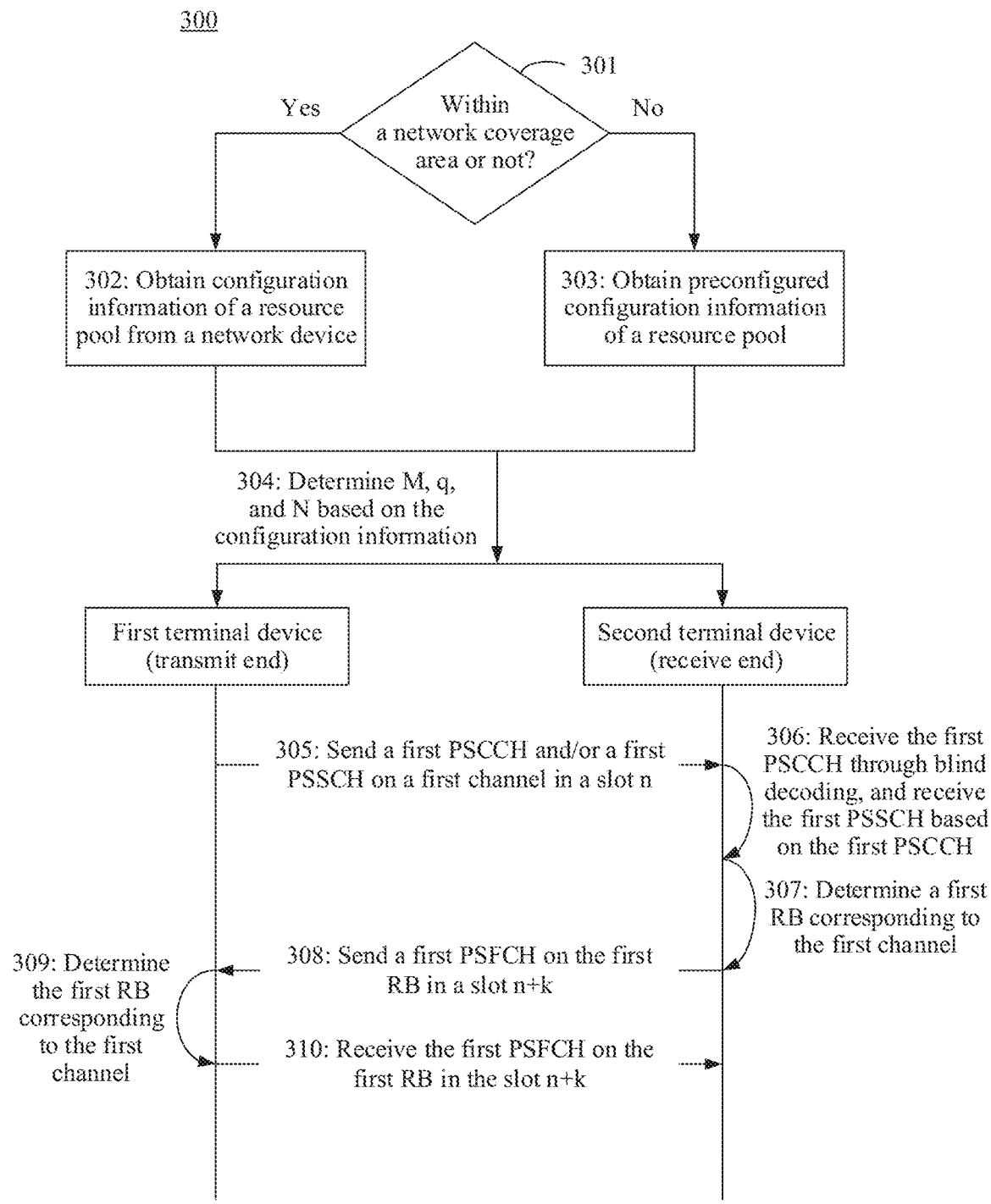
Figure 7:
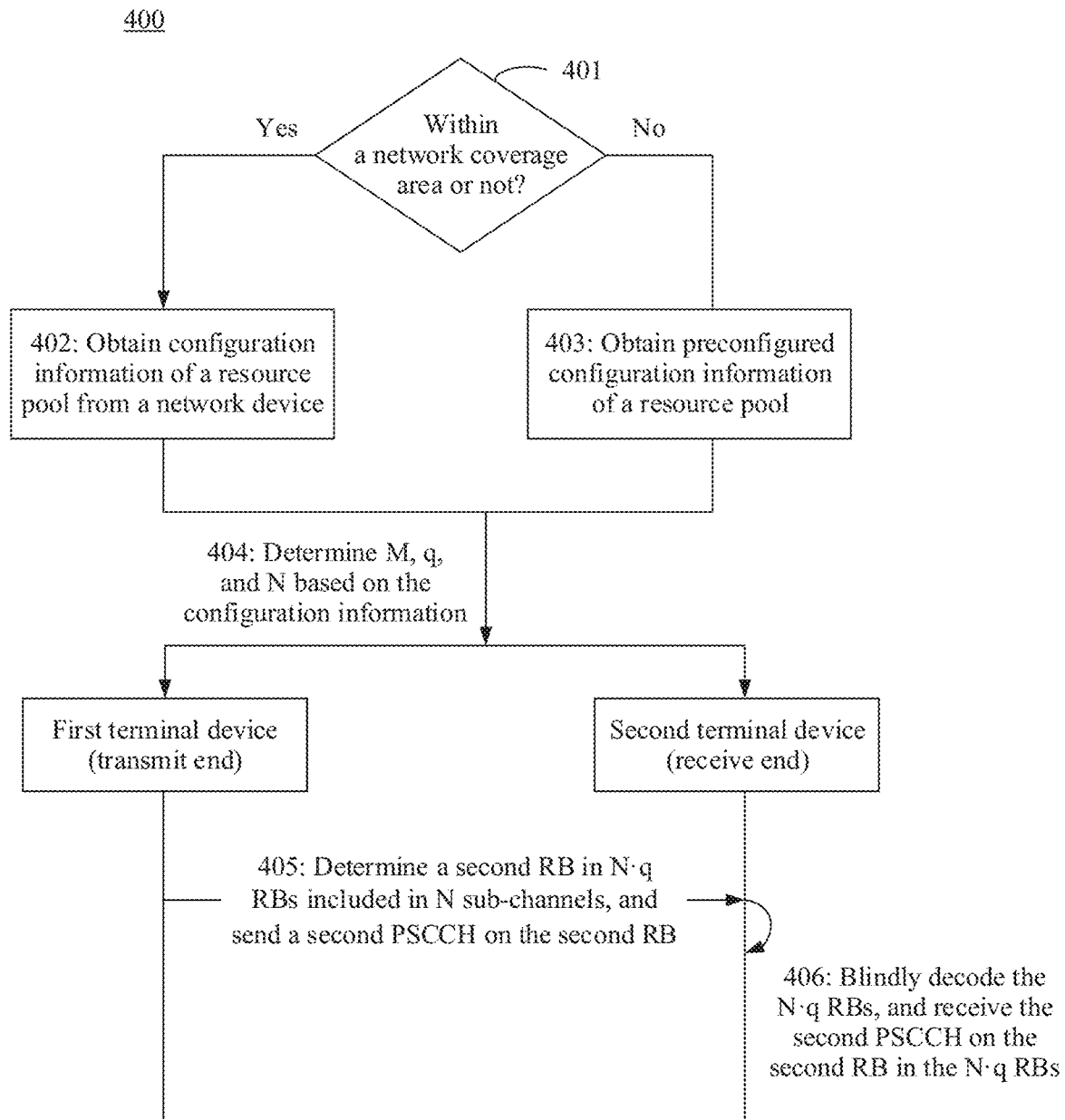
Figure 8:
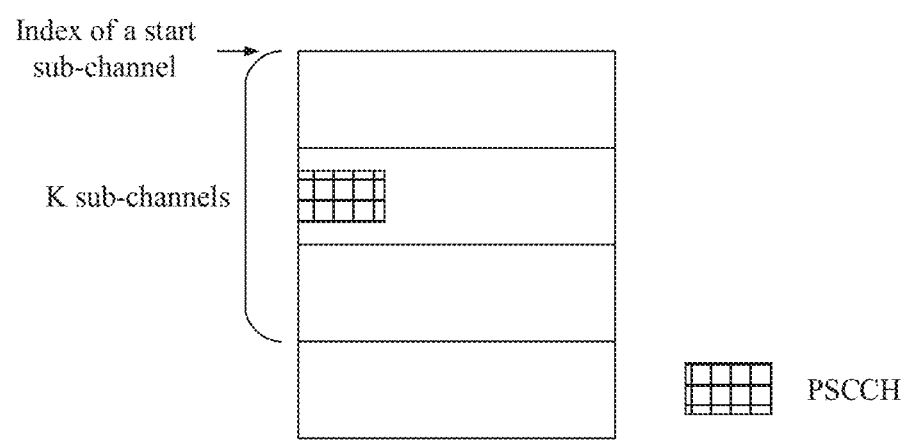
Figure 9:
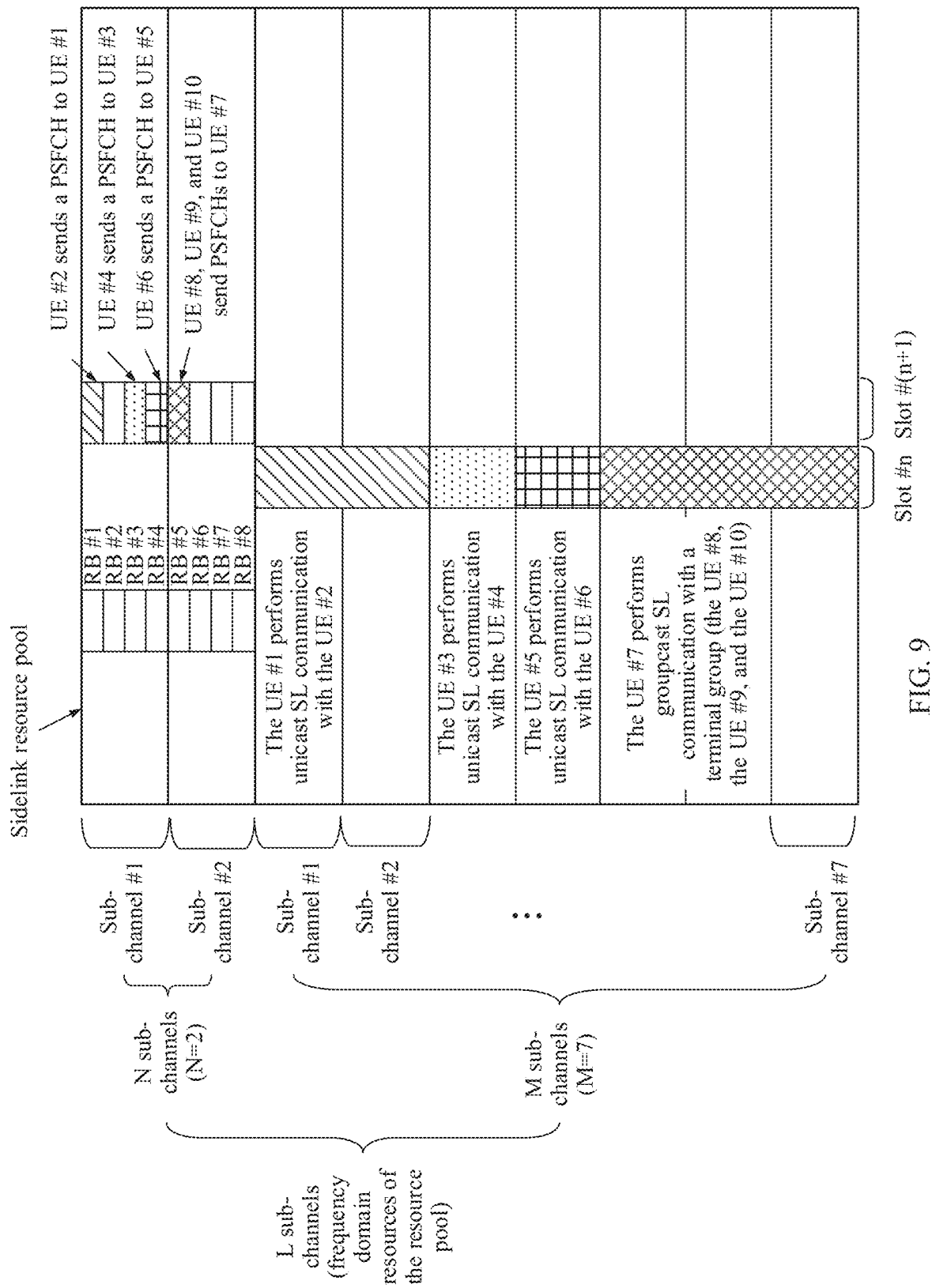
Figure 10:
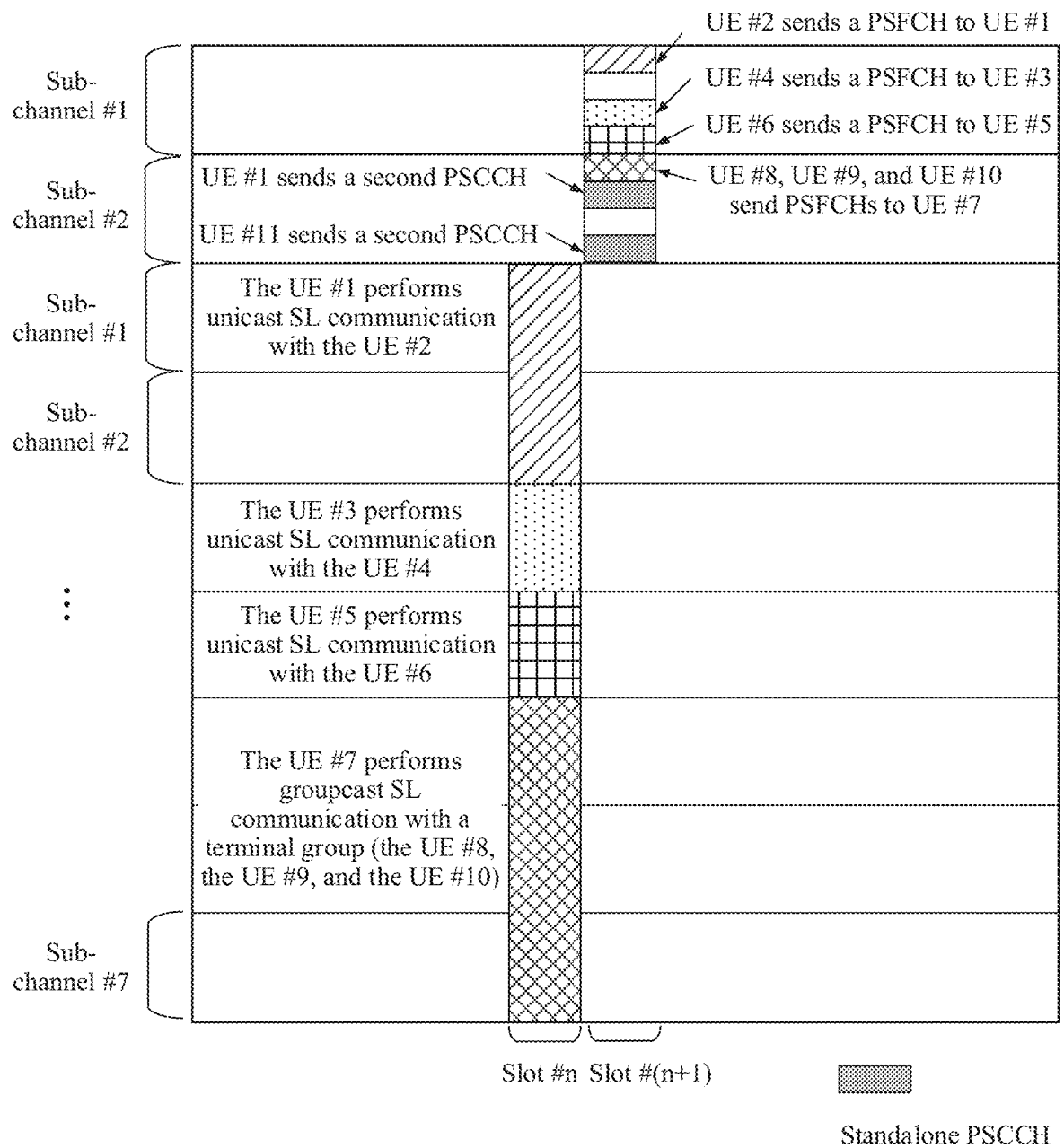
Figure 11:
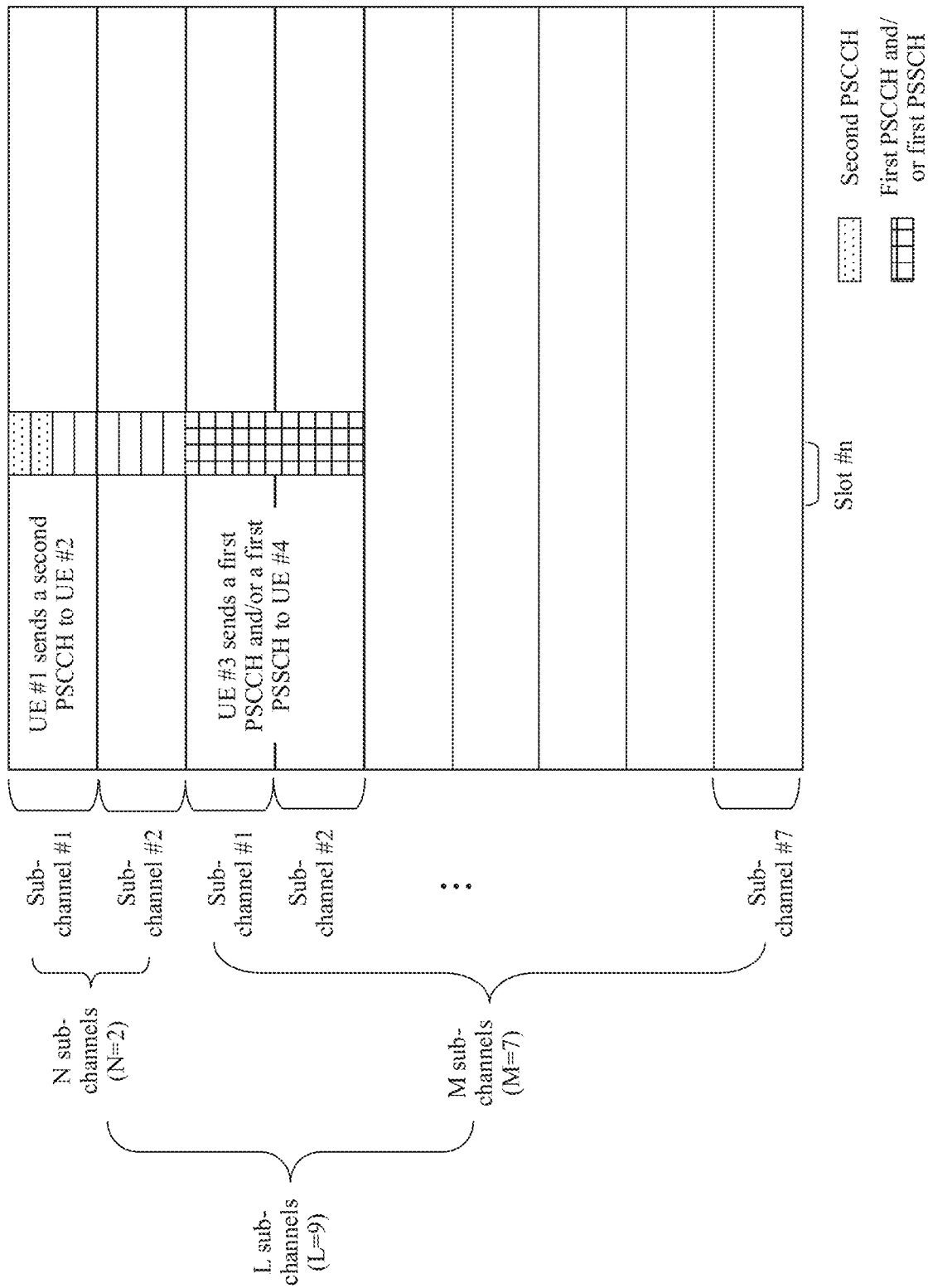
Figure 12:
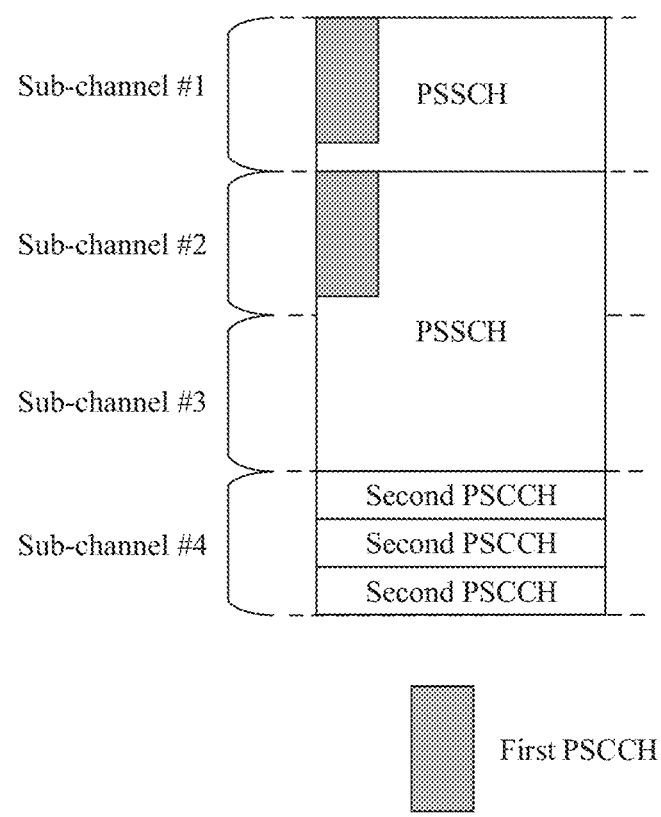
Figure 13:
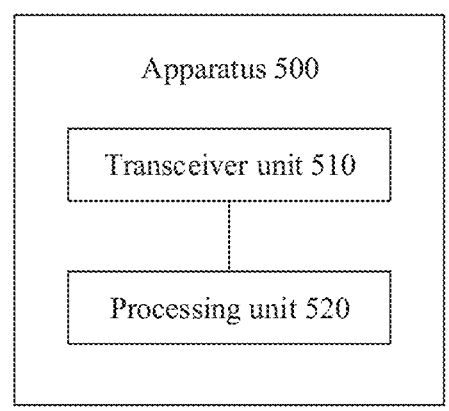
Figure 14:
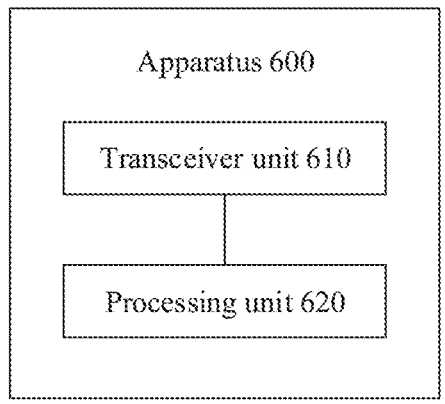
Figure 15:
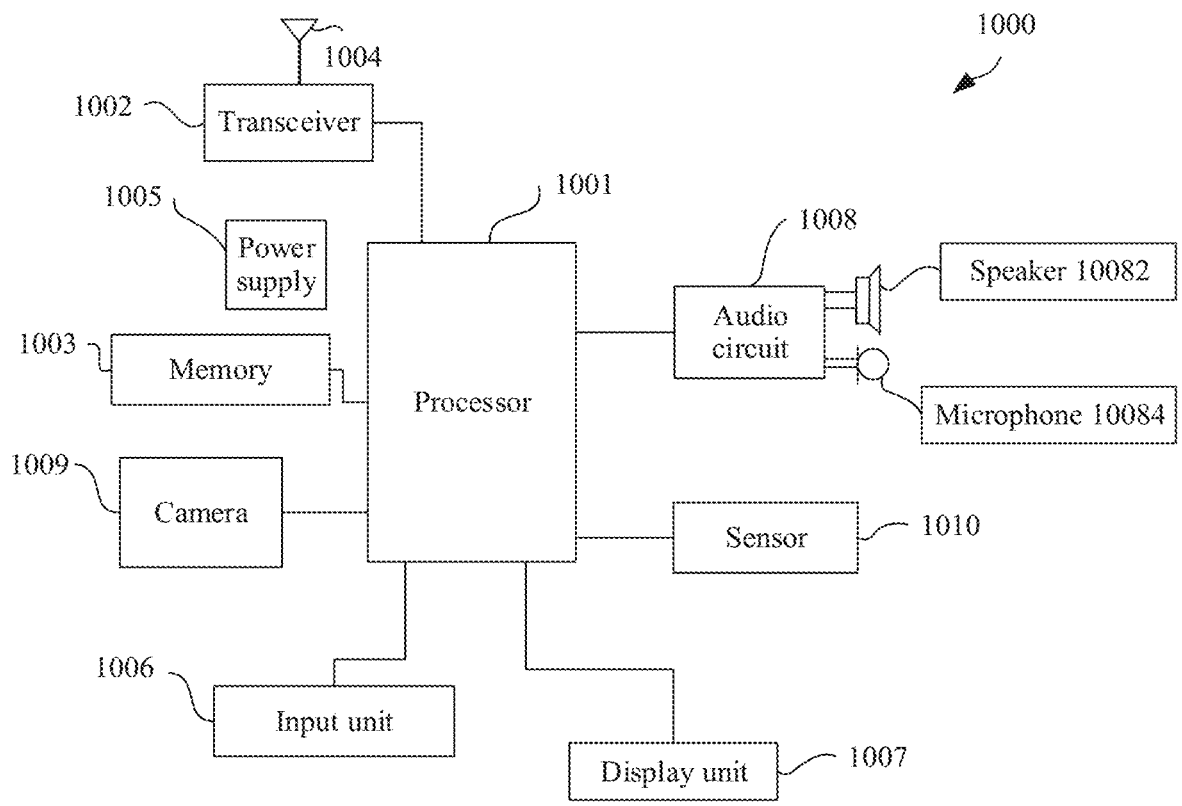

(*a*) and (*b*) in FIG. 3 respectively show a network device-resource scheduling mode and a user autonomous resource selection mode;

FIG. 4 is a schematic diagram of a correspondence between M sub-channels and N·q RBs included in N sub-channels:

FIG. 5 is a schematic interaction diagram of a feedback channel sending and receiving method according to this application;

FIG. 6 is a flowchart of sending and receiving a feedback channel according to this application;

FIG. 7 is a flowchart of sending a second PSCCH by a terminal device on a second RB;

FIG. 8 is a schematic diagram of a location of a sub-channel that is determined by a terminal device and that is used to send a PSCCH;

FIG. 9 is an example of a feedback channel sending method according to this application;

FIG. 10 is an example of sending a second PSCCH on a second RB according to this application;

FIG. 11 is an example of sending a second PSCCH by a first terminal device on N sub-channels:

FIG. 12 is an example of a location of a second PSCCH in a resource pool:

FIG. 13 is a schematic block diagram of a feedback channel receiving apparatus 500 according to this application;

FIG. 14 is a schematic block diagram of a feedback channel sending apparatus 600 according to this application; and FIG. 15 is a schematic structural diagram of a terminal device 1000 according to this application.

DESCRIPTION OF EMBODIMENTS

The following describes technical solutions of this application with reference to the accompanying drawings.

The technical solutions of this application can be applied to a vehicle-to-everything (V2X) communication system in both a scenario with network coverage and a scenario without network coverage. V2X is standardized and defined in a network of a long term evolution (LTE) technology of the 3rd Generation Partnership Project (3GPP). The V2X may refer to communication between a vehicle and any external thing, for example, vehicle to vehicle (V2V) communication, vehicle to pedestrian (V2P) communication, vehicle to infrastructure (V2I) communication, vehicle to network (V2N) communication, and the like.

Figure 1:
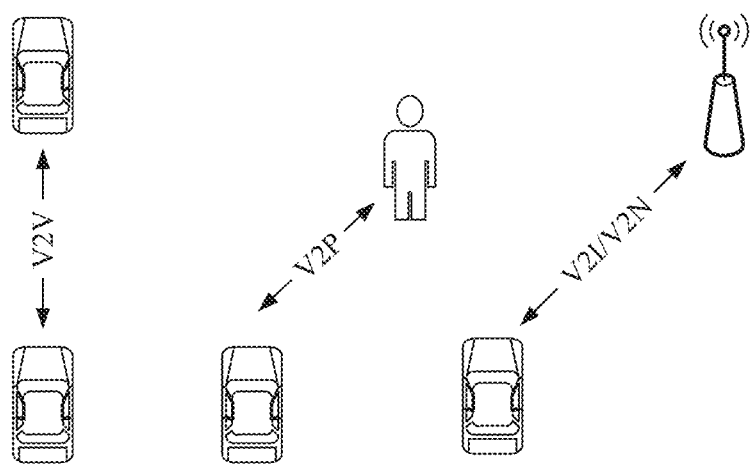
FIG. 1 is a schematic diagram of a V2X communication scenario.

FIG. 1 is a schematic diagram of a V2X communication scenario. In V2X communication, a link between a vehicle-user equipment (V-UE) and a vehicle-user equipment, a link between a pedestrian user equipment and a vehicle-user equipment, and a link between roadside unit (RSU) devices are referred to as sidelinks (SL). A link between a vehicle user equipment and a network device is referred to as a downlink (DL) or an uplink (UL), an air interface of the link is also referred to as a Uu air interface, and corresponding DL communication and UL communication are also referred to as Uu communication.

In the technical solutions of this application, in Uu air interface transmission, two parties of wireless communication are a network device and a terminal device. In SL air interface transmission, two parties of wireless communication are both terminal devices.

The network device mentioned in this application includes, for example, an access network (AN) device such as a base station (for example, an access point), and may be a device that communicates with a wireless terminal device over an air interface by using one or more cells in an access network. Alternatively, for example, a network device in a V2X technology is a road side unit (RSU). The base station may be configured to mutually convert a received over-the-air frame and a received Internet protocol (IP) packet, and serve as a router between the terminal device and the other parts of the access network, where the other parts of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolutional Node B) in an LTE system or a long term evolution-advanced (LTE-A) system, may include a next generation NodeB (gNB) in a 5G NR system, or may include a centralized unit (CU) and a distributed unit (DU) in a cloud access network (Cloud RAN) system. This is not limited in the embodiments of this application.

The terminal device mentioned in this application includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device communication (device-to-device, D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, but not limitation, the terminal device in the embodiments of this application may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs. However, if the various terminal devices described above are located on a vehicle (for example, placed in the vehicle or installed in the vehicle), the terminal devices may be considered as vehicle-mounted terminal devices. For example, the vehicle-mounted terminal devices are also referred to as on-board units (OBU).

A resource pool (RP) of a sidelink is used for SL communication between terminal devices. The resource pool is a resource set including time domain resources and frequency domain resources. The time domain resources include several sidelink sub-frames, and the frequency domain resources include several sub-channels (sub-channel). SL control information and SL data information are involved in the SL communication. A location of a resource used by the SL data information is indicated or scheduled by using the SL control information. A location of a resource used by the SL control information is relatively fixed, to reduce complexity of blind decoding (BD) performed by a receive end performing sidelink communication. The SL control information is carried on a physical sidelink control channel (PSCCH), and the SL data information is carried on a physical sidelink shared channel (PSSCH). The PSCCH is used to schedule the PSSCH. The receive end performing SL communication learns of a location of a resource for the PSSCH by receiving the PSCCH, and decodes the PSSCH based on a correctly decoded PSCCH.

Figure 2:
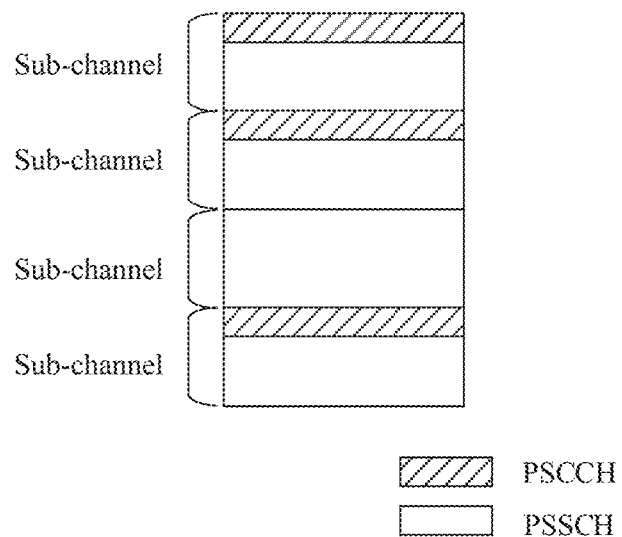
FIG. 2 is a schematic diagram of a sidelink resource pool.

FIG. 2 is a schematic diagram of a sidelink resource pool. As shown in FIG. 2, the resource pool includes several sub-channels in frequency domain. A PSCCH may include several resource blocks (RB) of a sub-channel in frequency domain, where an index of the sub-channel is the smallest, and include one subframe in time domain. Optionally, the resource pool includes several sub-channels in frequency domain, where the PSCCH may include several RBs in frequency domain, and include one slot or several OFDM symbols in time domain.

In addition, in a V2X communication system, a resource allocation manner may support a scheduling mode of a network device and an autonomous selection mode of a user. Refer to (a) and (b) in FIGS. 3. (a) and (b) in FIG. 3 respectively show a network device-resource scheduling mode and a user autonomous resource selection mode. In the network device resource scheduling mode shown in (a) in FIG. 3, a network device sends downlink scheduling information to a terminal device, where the downlink scheduling information is used to indicate resources for sending a PSCCH and a PSSCH by UE #1. The UE #1 sends the PSCCH and the PSSCH on the resources indicated by the downlink scheduling information. The UE #2 receives the PSCCH and the PSSCH from the UE #1 by blind decoding resources corresponding to a sidelink resource pool. In the user autonomous resource selection mode shown in (b) of FIG. 3, a transmit end (for example, UE #1) performing sidelink communication selects, according to a resource selection mechanism, resources for sending a PSCCH and a PSSCH, and sends the PSCCH and the PSSCH on the selected resources. Similarly, a receive end (for example, UE #2) receives the PSCCH through blind decoding, and then receives the PSSCH based on the PSCCH. It can be learned that, regardless of which mode is used, the receive end of the SL communication blindly decodes the PSCCH in the resource pool, then obtains sidelink control information (SCI) by decoding the PSCCH, and receives the PSSCH.

The following describes the technical solutions of this application in detail.

In the technical solutions of this application, the network device defines a sidelink resource pool (referred to as a resource pool for short below), and the resource pool includes L sub-channels in total. Specifically, the L sub-channels in the resource pool are divided into two parts. M of the L sub-channels are used by a first terminal device to send a PSCCH and/or a PSSCH, and N of the L sub-channels are used by the first terminal device to receive a PSFCH from a second terminal device, where L=M+N, and L, M, and N are all positive integers. Each of the L sub-channels includes q RBs. In other words, each of the M sub-channels includes q RBs, and each of the N sub-channels also includes q RBs.

It may be understood that because each of the L sub-channels includes q RBs, the N sub-channels include N·q RBs in total, where N·q≥M.

In this application, there is a correspondence between the M sub-channels and the N·q RBs included in the N sub-channels. Specifically, each of the M sub-channels is corresponding to one of N·q RBs included in the N sub-channels. In other words, each of the M sub-channels is definitely corresponding to one of N·q RBs included in the N sub-channels.

N·q≥M. Therefore, when N·q=M, each of the M sub-channels is corresponding to one of the N·q RBs included in the N sub-channels. Each of the N·q RBs included in the N sub-channels is corresponding to one of the M sub-channels. When N·q>M, each of the M sub-channels is corresponding to one of the N·q RBs included in the N sub-channels. However, some of the N·q RBs included in the N sub-channels are not corresponding to any one of the M sub-channels. This situation will be described in detail in the following descriptions.

FIG. 4 is a schematic diagram of a correspondence between M sub-channels and N·q RBs included in N sub-channels according to this application. As shown in FIG. 4, a resource pool includes nine sub-channels in total, where seven sub-channels are used by a first terminal device to send a PSCCH and/or a PSSCH, and the other two sub-channels are used by the first terminal device to receive a PSFCH from a second terminal device. Each of the nine sub-channels includes four RBs. Therefore, the two sub-channels used by the first terminal device to receive the PSFCH from the second terminal device include eight RBs in total. There is a correspondence between the seven sub-channels used by the first terminal device to send the PSCCH and/or the PSSCH and the eight RBs included in the two sub-channels used by the first terminal device to receive the PSFCH from the second terminal device. An $m^{th}$ sub-channel in the seven sub-channels is corresponding to an $m^{th}$ RB in the eight RBs included in the two sub-channels, where $1 \leq m \leq M$, and m is an integer. As shown in FIG. 3, there is a correspondence between an RB and a sub-channel that are filled with a same pattern. It should be noted that an RB #8 is not corresponding to any one of the seven sub-channels. When N·q>M shown in FIG. 4, there is a correspondence between the M sub-channels and M RBs that are in the N sub-channels and whose sequence numbers are ranked the first in ascending order. To be specific, the RBs that are in the N sub-channels and whose sequence numbers are in ascending order are in a one-to-one correspondence with the M sub-channels whose sequence numbers are in ascending order. In FIG. 4, an RB 1 to an RB 7 are respectively corresponding to a sub-channel 1 to a sub-channel 7. To be specific, the RB 1 is corresponding to the sub-channel 1, the RB 2 is corresponding to the sub-channel 2, the RB 3 is corresponding to the sub-channel 3, the RB 4 is corresponding to the sub-channel 4, the RB 5 is corresponding to the sub-channel 5, the RB 6 is corresponding to the sub-channel 6, and the RB 7 is corresponding to the sub-channel 7. Certainly, there may alternatively be a correspondence between any M of the N·q RBs included in the N channels and the M sub-channels. For example, there is a correspondence between the M sub-channels and M RBs that are in the N sub-channels and whose sequence numbers are ranked the first in descending order.

After defining the quantity L of the sub-channels included in the frequency domain resources of the resource pool and the quantity q of the RBs included in each of the L sub-channels, the network device notifies the terminal device of L and q. The two parties performing SL communication may determine, based on L and q, M, N, and a quantity N·q of RBs included in the N sub-channels. For example, the receive end performing SL communication may send, on an RB corresponding to each of the M sub-channels, feedback information for a PSCCH and/or a PSSCH received on one of the M sub-channels. Correspondingly, after sending the PSCCH and/or the PSSCH on one of the M sub-channels, the transmit end receives, from the receive end on the RB corresponding to each of the M sub-channels, the PSFCH sent by the receive end for the PSCCH and/or the PSSCH.

Numbers "first" and "second" in the following descriptions are merely intended to distinguish between different described objects, for example, distinguish between different terminal devices, different sub-channels, and different PSCCHs, and should not constitute a limitation on the technical solutions in the embodiments of this application.

FIG. 5 is a schematic interaction diagram of a feedback channel sending and receiving method according to this application.

110: A first terminal device and a second terminal device obtain configuration information of a sidelink resource pool.

The sidelink resource pool is used for sidelink communication between the first terminal device and the second terminal device. The configuration information is used to indicate that frequency domain resources of the resource pool include L sub-channels and each of the L sub-channels includes q RBs. The L sub-channels are divided into M sub-channels and N sub-channels, where the M sub-channels are used by the first terminal device to send a PSCCH and/or a PSSCH, and the N sub-channels are used by the first terminal device to receive a PSFCH from the second terminal device. There is a correspondence between each of the M sub-channels and one of N·q RBs included in the N sub-channels, where N·q≥M, and L, M, N, and q are all integers greater than or equal to 1.

Optionally, in another implementation, a network device may define two resource pools. One resource pool includes only the M sub-channels, and each of the M sub-channels includes q1 RBs. The other resource pool includes only the N sub-channels. Each of the N sub-channels includes $q_2$ RBs, where $q_1=q_2$, or $q_1 \neq q_2$. There is a correspondence between each of the M sub-channels and one of N·$q_2$ RBs included in the N sub-channels, where N·$q_2 \geq M$, and M, N, q1, and q2 are all integers greater than or equal to 1.

In other words, the network device configures one resource pool for a resource used by the first terminal device to send the PSCCH and/or the PSSCH, and configures another resource pool for a resource used by the first terminal device to receive the PSFCH from the second terminal device, to distinguish different physical channel resources by using different resource pools. The network device generates one piece of configuration information for each resource pool to notify a terminal device. This is not limited in this embodiment of this application.

It should be understood that the first terminal device and the second terminal device are respectively, for example, used as a transmit end and a receive end that perform SL communication.

120: The first terminal device sends a first PSCCH and/or a first PSSCH to the second terminal device on a first channel in a slot n.

Correspondingly, the second terminal device receives the first PSCCH and/or the first PSSCH from the first terminal device on the first channel in the slot n.

The first channel includes one or more of the M sub-channels.

The first terminal device may send the first PSCCH and/or the first PSSCH on the first channel scheduled by the network device. Alternatively, the first terminal device may autonomously select the first channel, and send the first PSCCH and/or the first PSSCH to the second terminal device on the autonomously selected first channel.

As described in (a) and (b) in FIG. 3, in a scheduling mode of the network device or in an autonomous resource selection mode of the first terminal device, the second terminal device receives the first PSCCH by blind decoding the resource pool, and receives the first PSSCH based on the received first PSCCH.

130: The first terminal device determines, based on the correspondence and the first channel, a first RB on which a first PSFCH sent by the second terminal device for the first PSCCH and/or the first PSSCH is received.

Correspondingly, the second terminal device determines, based on the correspondence, the first RB for sending the first PSFCH for the first PSCCH and/or the first PSSCH. It should be understood that the first RB belongs to the N·q RBs included in the N sub-channels.

The correspondence is a correspondence between each of the M sub-channels and one of N·q RBs included in the N sub-channels.

A process in which the first terminal device determines the first RB based on the correspondence is the same as a process in which the second terminal device determines the first RB based on the correspondence. The first terminal device is used as an example below for description.

That the first channel includes one of the M sub-channels and that the first channel includes a plurality of sub-channels in the M sub-channels are separately described below.

Case 1:
   The first channel includes one of the M sub-channels.
   In step 110, the first terminal device obtains the configuration information of the resource pool, where the configuration information is used to indicate L and q. The first terminal device may determine M and N based on L, q, and relationships $N=\lceil L/(1+q)\rceil$ and $L=M+N$ that are satisfied by L, M, N, and q, where $\lceil\ \rceil$ represents rounding up.
   Alternatively, L, M, N, and q may be indicated in the configuration information.
   After determining M and N, the first terminal device may determine, with reference to q, a quantity N·q of the RBs included in the N sub-channels. Then, the first terminal device determines, based on the correspondence between the M sub-channels and the N·q RBs, the first RB that is in the N·q RBs and that is corresponding to the first channel.
Case 2:
   The first channel includes a plurality of sub-channels in the M sub-channels.
   In the case 2, if the first channel includes a plurality of sub-channels in the M sub-channels. In this case, a method the same as that in the case 1 is used. The first terminal device may determine an RB that is in the N·q RBs and that is corresponding to each of the plurality of sub-channels that are in the M sub-channels and that are included in the first channel. In other words, each of the plurality of sub-channels included in the first channel is corresponding to one of the N·q RBs. In this case, the plurality of sub-channels included in the first channel are corresponding to a plurality of RBs in the N·q RBs.
   For example, the first channel includes three of the M sub-channels, and each of the three sub-channels is corresponding to one of the N·q RBs. Therefore, the three sub-channels are corresponding to three of the N·q RBs in total.
   Optionally, in the case 2, when the first channel includes the plurality of sub-channels in the M sub-channels, the second terminal device may select to send the first PSFCH for the first PSCCH and/or the first PSSCH on one of the plurality of RBs corresponding to the plurality of sub-channels included in the first channel. Alternatively, the second terminal device may send the first PSFCH on all of the plurality of sub-channels included in the first channel.
   Further, optionally, if the second terminal device selects to send the first PSFCH on one of the plurality of RBs corresponding to the plurality of sub-channels included in the first channel. In an optional implementation, the second terminal device may select to send the first PSFCH on an RB that is corresponding to a smallest RB index and that is in the plurality of RBs corresponding to the plurality of sub-channels included in the first channel. That is, the RB that is corresponding to the smallest RB index and that is in the plurality of RBs corresponding to the plurality of sub-channels included in the first channel is the first RB. Values of RB indexes are [0, (N·q−1)], corresponding to all N·q RBs included in the N sub-channels.
   Certainly, the second terminal device may alternatively randomly select one RB from the plurality of RBs corresponding to the plurality of sub-channels included in the first channel to send the first PSFCH. In this case, the first terminal device and the second terminal device may agree on a selection rule in advance. For example, the second terminal device selects to send the first PSFCH on an RB that is corresponding to a largest RB index and that is in the plurality of RBs corresponding to the plurality of sub-channels included in the first channel, or the selection rule is specified in a protocol.

It should be understood that in step 120, the first terminal device sends the first PSCCH and/or the first PSSCH to the second terminal device on the first channel. The second terminal device receives the first PSCCH and/or the first PSSCH from the first terminal device on the first channel. In step 130, the second terminal device determines the first RB used to send the first PSFCH for the first PSCCH and/or the first PSSCH. Correspondingly, the first terminal device also needs to determine the first RB on which the first PSFCH sent by the second terminal device for the first PSCCH and/or the first PSSCH is received from the second terminal device.

140: The first terminal device receives, from the second terminal device on the first RB in a slot n+k, the first PSFCH sent by the second terminal device for the first PSCCH and/or the first PSSCH, where n≥0, k≥1, and both n and k are integers.

In the slot n+k, the second terminal device sends, on the first RB, the first PSFCH for the first PSCCH and/or the first PSSCH. The first terminal device receives, on the first RB, the first PSFCH sent by the second terminal device.

In the technical solution of this application, the network device divides the L sub-channels included in the frequency domain resources in the sidelink resource pool into two parts: the M sub-channels used by the first terminal device to send the PSCCH and/or the PSSCH and the N sub-channels used by the first terminal device to receive the PSFCH. The correspondence between the M sub-channels and the N·q RBs included in the N sub-channels is defined, so that the first terminal device (transmit end) and the second terminal device (receive end) that perform sidelink communication may determine, without any indication on a feedback resource, a location of a resource for receiving or sending the PSFCH, thereby reducing signaling overheads of an air interface.

In addition, receiving of the PSFCH by the transmit end performing sidelink communication or sending of the PSFCH by the receive end does not need to be scheduled by the network device. A resource does not need to be autonomously selected based on some specific conditions (for example, channel listening) either. Therefore, complexity of implementing sidelink communication between a communication system and two parties of SL communication can be reduced.

Further, in an autonomous resource selection mode of a user, a collision between a resource autonomously selected by the user for sending the PSFCF and a resource selected by another user for sending the PSCCH or the PSSCH is avoided, thereby ensuring reliability of V2X communication.

It should be noted that, in time domain, there is a time relationship between the PSSCH and the PSFCH, and the time relationship may be represented as n+k. The slot n is a slot in which the PSSCH sent by the transmit end performing sidelink communication is located. The slot n+k is a slot after the slot n, k may be an integer greater than or equal to 1. For example, k=1, 2, 3, . . . . A specific value of k may be determined based on a quality of service (QoS) requirement of a service, provided that feedback time of the PSFCH satisfies QoS. Therefore, in scenarios with different QoS requirements, k may be designed to have different values. A value of k is not limited in this application.

Further, the value of k may be represented by using several bits. For example, 2, 3, or 4.

In some optional implementations, the first terminal device may obtain the value of k in the following manners.

Manner 1

The value of k is carried in the configuration information of the resource pool.

In step 110, the network device sends the configuration information of the resource pool to a terminal device (for example, the first terminal device and the second terminal device), where the configuration information carries the value of k. The first terminal device can obtain the value of k from the configuration information of the resource pool.

Manner 2

The value of k is carried in a system information block (SIB), cell-specific radio resource control (RRC) signaling, or user-specific (UE-specific) RRC signaling.

It should be understood that the several types of signaling enumerated in the manner 2 are merely examples. A person skilled in the art may also think of that the network device includes the value of k to another message or signaling to notify the terminal device. This is not limited in this application.

Manner 3

The value of k is preconfigured.

In the manner 3, the network device does not need to specifically notify an end device of the value of k. The terminal device does not need to exchange information about the value of k with another terminal device either.

Similar to the first terminal device, the second terminal device may also determine the value of k in the foregoing three manners.

In another implementation, after obtaining the value of k, the first terminal device may include the value of k in the first PSCCH sent to the second terminal device, that is, the value of k is carried in sidelink control information (SCI), to notify the second terminal device of the value of k. Therefore, the second terminal device may further obtain the value of k from the first PSCCH sent by the first terminal device.

As described above, the technical solution of this application is applicable to both a V2X communication system with network coverage and a V2X communication system without network coverage. The following separately describes a detailed procedure of performing sidelink communication between terminal devices in a scenario with network coverage and a scenario without network coverage.

FIG. 6 is a flowchart 300 of sending and receiving a feedback channel according to this application.

301: A first terminal device determines whether the first terminal device is within a network coverage area.

If the first terminal device is within the network coverage area, step 302 is performed. If the first terminal device is not within the network coverage area, step 303 is performed.

302: The first terminal device obtains configuration information of a resource pool from a network device.

The configuration information is used to indicate a resource pool that is configured by the network device and that is used by the first terminal device to perform sidelink communication with another terminal device. For detailed descriptions of the configuration information, refer to the descriptions in step 110. Details are not described herein again.

Steps 304 to 310 are performed after step 302.

303: The first terminal device obtains preconfigured configuration information of a resource pool.

Steps 304 to 310 are performed after step 303.

304: The first terminal device determines M, N, and q based on the configuration information.

305: The first terminal device sends a first PSCCH and/or a first PSSCH to a second terminal device on a first channel in a slot n.

Herein, the first channel includes one or more of M sub-channels.

306: The second terminal device performs blind PSCCH detection, receives the first PSCCH from the first terminal device on the first channel in the slot n, and receives the first PSSCH based on the received first PSSCH.

307: The second terminal device determines a first RB that is corresponding to the first channel and that is in N·q RBs included in N sub-channels.

The first RB belongs to the N·q RBs included in the N sub-channels.

308: The second terminal device sends a first PSFCH for the first PSCCH and/or the first PSSCH to the first terminal device on the first RB in a slot n+k.

309: The first terminal device determines the first RB that is corresponding to the first channel and that is in N·q RBs included in N sub-channels.

310: The first terminal device receives the first PSFCH from the second terminal device on the first RB in the slot n+k.

As described above, when N·q>M, (N·q−M) RBs in the N·q RBs included in the N sub-channels are not corresponding to any one of the M sub-channels. In this application, another RB that is in the N·q RBs and that is other than an RB corresponding to one of the M sub-channels is referred to as a second RB.

It may be understood that the N·q RBs included in the N sub-channels may include one second RB, or may include a plurality of second RBs.

Optionally, the second RB may be used to send a second PSCCH. The second PSCCH may occupy one second RB, or may occupy a plurality of second RBs. This is not limited herein.

It should be noted that the second PSCCH is different from the first PSCCH. As described above, the first PSCCH is used to schedule the PSSCH, and the first PSCCH and the PSSCH scheduled by using the first PSCCH are located in a same slot in time domain.

In a possible implementation, the second PSCCH is not used to schedule the PSSCH. In another possible implementation, the second PSCCH is used to schedule the PSSCH, but the second PSCCH and the PSSCH scheduled by using the second PSCCH are located in different slots in time domain.

Alternatively, in the embodiments of this application, the first PSCCH may also be referred to as a non-standalone PSCCH. The second PSCCH may also be referred to as a standalone PSCCH.

The standalone PSCCH (for example, the second PSCCH) may be used for cross-slot scheduling. In other words, the standalone PSCCH and a scheduled PSSCH are located in different slots. Alternatively, the standalone PSCCH may not be used for PSSCH scheduling, or may be used for non-PSSCH scheduling. For example, the standalone PSCCH is used to allocate resources to another terminal device and a group user (group), to request the another terminal device to send a channel state information feedback or a specific reference signal (RS), for example, a channel state information-reference signal (CSI-RS).

In the embodiments of this application, the another RB (namely, the second RB) that is in the N·q RBs included in the N sub-channels and that is other than an RB corresponding to one of the M sub-channels is used to send the standalone PSCCH, to improve resource utilization, and improve performance of the V2X communication system. The following provides description with reference to FIG. 7.

FIG. 7 is a flowchart 400 of sending a second PSCCH by a terminal device on a second RB.

401: A first terminal device determines whether the first terminal device is within a network coverage area.

If the first terminal device is within the network coverage area, the first terminal device performs step 402. If the first terminal device is not within the network coverage area, the first terminal device performs step 403.

402: The first terminal device obtains configuration information of a resource pool from a network device.

Steps 404 to 406 are performed after step 402.

403: The first terminal device obtains preconfigured configuration information of a resource pool.

404: The first terminal device determines M, N, and q based on the configuration information.

405: The first terminal device determines a second RB in N·q RBs included in N sub-channels, and sends a second PSCCH to the first terminal device on the second RB.

406: The second terminal device blindly decodes the N·q RBs included in N sub-channels, and receives the second PSCCH from the first terminal device on the second RB.

In the foregoing embodiments, resources for PSCCHs (for example, the first PSCCH and the second PSCCH) are all located in the $1^{st}$ sub-channel in one or more of the M sub-channels included in the first channel. Specifically, the PSCCH may continuously occupy several RBs starting from an RB with a smallest index included in the first channel. In other words, the first several RBs in the first channel are used to send the PSCCH.

This application provides another implementation. A location of the PSCCH is no longer fixed on the $1^{st}$ sub-channel in the one or more of the M sub-channels included in the first channel. Specifically, the location of the PSCCH may be located on a second channel, and the second channel is one of one or more sub-channels included in the first channel.

Specifically, an index $n_{subCH}^{PSCCH}$ of one sub-channel (namely, the second channel) that is in the M sub-channels and that is used to send the PSCCH may be determined through calculation according to the following formula (1):

$$n_{subCH}^{PSCCH} = n_{subCH}^{start} + \lfloor (K_{subCH}-1)/2 \rfloor \quad (1),$$

where $n_{subCH}^{start}$ is an index of a start sub-channel in the one or more sub-channels included in the first channel, and $K_{subCH}$ is a quantity of sub-channels included in the first channel.

As a receive end of sidelink communication, the second terminal device calculates, according to formula (1), the index of the second channel that needs to be blindly decoded, and blindly decodes the first PSCCH on the second channel. In the foregoing embodiment, the second terminal device needs to blind decode all sub-channels included in the M sub-channels. Compared with the foregoing embodiment, complexity of blind decoding by the second terminal device can be reduced.

It should be noted that a PSCCH of a user is placed in the middle of a PSSCH, and in frequency domain, the PSCCH of the user is adjacent only to the PSSCH of the user, and is not adjacent to a PSCCH or PSSCH of another user, so that in-band emission (IBE) of another user to the user can be reduced, and transmission reliability of the PSCCH of the user can be improved.

FIG. 8 is a schematic diagram of a location of a determined sub-channel used to send a PSCCH. As shown in FIG. 8, when $n_{subCH}^{start}=3$ and $K_{subCH}=3$ and $K_{subCH}=3$, 3+1=4. Therefore, the sub-channel used to send the PSCCH is the fourth sub-channel in the plurality of sub-channels included in the first channel.

The following describes, by using an example, a feedback channel sending and receiving method provided by this application.

FIG. 9 is an example of a feedback channel sending method according to this application. It is assumed that k=L. A network device configures a resource pool used for sidelink communication between UE #1 to UE #10. The resource pool includes nine sub-channels in total, and a size of each sub-channel is four RBs. That is, L=9, and q=4. UE may learn, based on a relationship between L, M, N, and q, that $N=\lceil(1+q)\rceil=2$, M=L−N=7, and N·q=8.

In a slot n, the network device schedules the UE #1 to send a PSCCH and a PSSCH to the UE #2 on a first channel to perform unicast sidelink communication, where the first channel includes the $1^{st}$ sub-channel and the $2^{nd}$ sub-channel in the M sub-channels. In a slot n+1, the UE #2 sends a PSFCH for the PSCCH and the PSSCH to the UE #1 on the $1^{st}$ RB in the eight RBs included in the N sub-channels.

As described above, when the first channel includes a plurality of sub-channels in the M sub-channels, a second terminal device may send the PSFCH on an RB with a smallest index in a plurality of RBs corresponding to the plurality of sub-channels included in the M sub-channels included in the first channel, may send the PSFCH on one of the RBs, or may send the PSFCH all of the plurality of RBs. Therefore, the UE #2 may alternatively send the PSFCH to the UE #1 on the $2^{nd}$ RB in the eight RBs included in the N sub-channels. Alternatively, the UE #2 sends the PSFCH to the UE #1 on the $1^{st}$ RB and the $2^{nd}$ RB in the eight RBs included in the N sub-channels.

In the slot n, the network device schedules the UE #3 to send a PSCCH and a PSSCH to the UE #4 on the $3^{rd}$ sub-channel in the M sub-channels, to perform unicast sidelink communication. In the slot n+1, the UE #4 sends a PSFCH to the UE #3 on the $3^{rd}$ RB in the eight RBs included in the N sub-channels.

In the slot n, the network device schedules the UE #5 to send a PSCCH and a PSSCH to the UE #6 on the $4^{th}$ sub-channel in the M sub-channels, to perform unicast sidelink communication. In the slot n+1, the UE #6 sends a PSFCH to the UE #5 on the $4^{th}$ RB in the eight RBs included in the N sub-channels.

In the slot n, the network device schedules the UE #7 to send a PSCCH and a PSSCH to a terminal group (the UE #8, the UE #9, and the UE #10) on the $5^{th}$ sub-channel in the M sub-channels, to perform groupcast sidelink communication. In the slot n+1, the UE #8, the UE #9, and the UE #10 send PSFCHs to the UE #7 on the $5^{th}$ RB in the eight RBs included in the N sub-channels.

Optionally, the UE #8, the UE #9, and the UE #10 may send PSFCHs to the UE #1 on the $5^{th}$ RB by sending different sequences or through code division multiplexing (CDM).

In the resource pool shown in FIG. 9, if the UE #2 sends the PSFCH to the UE #1 on the $1^{st}$ RB in the eight RBs included in the N sub-channels, generally, because a data amount of the PSFCH is relatively small, the PSFCH can be transmitted by occupying only a resource of one RB. FIG. 9 is only an example in which the $1^{st}$ RB is used by the UE #2 to send the PSFCH to the UE #1. Certainly, when the data amount of the PSFCH is relatively large, both the $1^{st}$ RB and the $2^{nd}$ RB may be used by the UE #2 to send the PSFCH to the UE #1. A situation of sending the PSFCH by another UE is similar. Details are not described again. The UE #3 sends the PSFCH to the UE #1 on the $3^{rd}$ RB in the eight RBs included in the N sub-channels, the UE #5 sends the PSFCH to the UE #1 on the $4^{th}$ RB in the eight RBs included in the N sub-channels, and the UE #8, the UE #9, and the UE #10 send the PSFCH to the UE #1 on the $5^{th}$ RB in the eight RBs included in the N sub-channels. In this case, the $2^{nd}$ RB, the $6^{th}$ RB, the $7^{th}$ RB, and the $8^{th}$ RB in the eight RBs included in the N sub-channels are all not corresponding to any of the M sub-channels. If these RBs are not used, resources are wasted.

Preferably, another RB (namely, the foregoing second RB) that is in the N·q RBs included in the N sub-channels and that is other than an RB corresponding to one of the M sub-channels is used to send a standalone PSCCH. The following provides an example for description with reference to FIG. 9.

FIG. 10 is an example of sending a second PSCCH on a second RB according to this application. A network device configures a resource pool used for sidelink communication between UE #1 to UE #10. The resource pool includes nine sub-channels in total, and a size of each sub-channel is four RBs. That is, L=9, and q=4. UE may learn, based on a relationship between L, M, N, and q, that N=[L/(1+q)]=2, M=L−N=7, and N·q=8.

A specific example in which the UE #1 sends a PSCCH and/or a PSSCH to another UE, and the another UE sends a PSFCH to the UE #1 may be shown in FIG. 9. Details are not described herein again.

On this basis, the UE #1 may send a standalone PSCCH (for example, the foregoing second PSCCH) on a second RB in the eight RBs included in the N sub-channels. The second RB may be the $2^{nd}$ RB, $6^{th}$ RB, $7^{th}$ RB, and $8^{th}$ RB in the eight RBs included in the N sub-channels.

Optionally, in another implementation, the N sub-channels in the resource may be used to send only the second PSCCH. Specifically, the first terminal device obtains configuration information of the sidelink resource pool from the network device, where the configuration information is used to indicate that the resource pool includes L sub-channels, M of the L sub-channels are used to send the first PSCCH and/or a first PSSCH, and N of the L sub-channels are used to send the second PSCCH. The first terminal device determines the N sub-channels based on the configuration information, and sends the second PSCCH on one or more of the N sub-channels. Correspondingly, the second terminal device also obtains the configuration information from the network device, determines the N sub-channels based on the configuration information, and blindly decodes the second PSCCH on the N sub-channels. The following provides description with reference to FIG. 11.

FIG. 11 is an example of sending a second PSCCH by a first terminal device on N sub-channels. As shown in FIG. 11, UE #1 obtains N from configuration information, to determine the N sub-channels used to send the second PSCCH. Assuming that N=2, and each of the two sub-channels includes four RBs, the two sub-channels include eight RBs in total. The UE #1 sends the second PSCCH to UE #2 on the $1^{st}$ RB and the $2^{nd}$ RB in the eight RBs.

In addition, UE #3 sends a first PSCCH and a first PSSCH to UE #4 on the $1^{st}$ sub-channel and the $2^{nd}$ sub-channel in M sub-channels in a resource pool, to perform unicast sidelink communication.

It should be noted that, in the embodiments of this application, the embodiment in which the first terminal device sends the second PSCCH on the second RB in the N·q RBs included in the N sub-channels and the embodiment in which the first terminal device sends the first PSFCH on the N sub-channels may be used independently of each other. In other words, the N sub-channels may be used to send only the second PSCCH.

FIG. 12 is an example of a location of a second PSCCH in a resource pool. As shown in FIG. 12, it is assumed that the resource pool includes four sub-channels in total: a sub-channel #1, a sub-channel #2, a sub-channel #3, and a sub-channel #4. The sub-channel #1, the sub-channel #2, and the sub-channel #3 are used by a first terminal device to send a non-standalone PSCCH (for example, the first PSCCH in this specification) and/or a PSSCH. The sub-channel #4 is used to send a standalone PSCCH, such as second PSCCHs shown in FIG. 12.

When N sub-channels may be used to send only a second PSCCH, as a transmit end of sidelink communication, a procedure in which the first terminal device sends the second PSCCH is as follows:

The first terminal device obtains configuration information of a sidelink resource pool, where the sidelink resource pool is used for sidelink communication between the first terminal device and a second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, and the N sub-channels are used by the first terminal device to send a second PSCCH, where L, M, and N are all integers greater than or equal to 1.

The first terminal device sends the second PSCCH on one or more of the N sub-channels.

As a receive end of the sidelink communication, a procedure in which the second terminal device receives the second PSCCH is as follows:

The second terminal device obtains configuration information of a sidelink resource pool, where the sidelink resource pool is used for sidelink communication between the first terminal device and the second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, and the N sub-channels are used by the first terminal device to send a second PSCCH, where L, M, and N are all integers greater than or equal to 1.

The second terminal device blindly decodes the N sub-channels, and receives the second PSCCH from the first terminal device.

Optionally, the second PSCCH may occupy one or more of all RBs included in the N sub-channels. This is not limited in this application.

In addition, the embodiment in which the first PSCCH is placed at a middle location of the first PSSCH shown in FIG. 8 may also be used independently.

As a transmit end of sidelink communication, a procedure in which the first terminal device sends the first PSCCH is as follows:

The first terminal device obtains configuration information of a sidelink resource pool, where the sidelink resource pool is used for sidelink communication between the first terminal device and the second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q is greater than or equal to M, and L, M, N, and q are all integers greater than or equal to 1.

The first terminal device sends the first PSCCH and/or the first PSSCH on a first channel, where the first channel includes one or more of the M sub-channels, the first PSCCH is located on a second channel, and the second channel is one of the one or more sub-channels included in the first channel, where an index of the second sub-channel satisfies a formula:

$$n_{subCH}^{PSCCH} = n_{subCH}^{start} + \lfloor (K_{subCH}-1)/2 \rfloor,$$

where $n_{subCH}^{start}$ is a start index of the one or more sub-channels included in the first channel, and $K_{subCH}$ is a quantity of sub-channels included in the first channel.

In this embodiment, after the first terminal device determines the first channel used to send the first PSSCH and/or the first PSSCH, the first terminal device calculates, based on a formula (1), the index $n_{subCH}^{start}$ of the second channel that is used to send the first PSSCH and that is in the one or more sub-channels included in the first channel. After determining the index of the second channel, the first terminal device sends the first PSCCH on the second channel, and sends the first PSSCH on another sub-channel that is in the one or more sub-channels included in the first channel and that is other than the second channel.

As a receive end of the sidelink communication, a procedure in which the second terminal device receives the first PSCCH is as follows:

The second terminal device obtains configuration information of a sidelink resource pool, where the sidelink resource pool is used for sidelink communication between the first terminal device and the second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a physical sidelink control channel PSCCH and/or a physical sidelink shared channel PSSCH, the N sub-channels are used by the first terminal device to receive a physical sidelink feedback channel PSFCH from the second terminal device, and there is a correspondence between one of the M sub-channels and one of N·q RBs included in the N sub-channels, where N·q is greater than or equal to M, and L, M, N, and q are all integers greater than or equal to 1.

The second terminal device determines an index of a second channel on which blind decoding needs to be performed, where the first PSCCH is carried on the second channel, the second channel is one of one or more sub-channels included in a first channel, the first channel includes one or more of the M sub-channels, the first PSSCH is carried on another sub-channel that is other than the second channel and that is in the one or more sub-channels included in the first channel, and an index of the second channel satisfies a formula $n_{subCH}^{PSCCH} = n_{subCH}^{start} + \lfloor (K_{subCH}-1)/2 \rfloor$, where $n_{subCH}^{start}$ is a start index of the one or more sub-channels included in the first channel, and $K_{subCH}$ is a quantity of sub-channels included in the first channel.

In this embodiment, the second terminal device receives the first PSCCH through blind decoding only on the determined second channel, and does not need to perform blind decoding on all the M sub-channels, thereby reducing complexity of blind decoding.

The foregoing describes in detail the feedback channel sending and receiving methods provided by this application. The following describes a feedback channel sending apparatus and a feedback channel receiving apparatus that are provided by this application.

FIG. 13 is a schematic block diagram of a feedback channel receiving apparatus 500 according to this application. The apparatus 500 includes a transceiver unit 510 and a processing unit 520. The apparatus 500 is configured to perform a step performed by the first terminal device in the embodiment shown in FIG. 5, FIG. 6, or FIG. 7.

The transceiver unit 510 is configured to obtain configuration information of a sidelink resource pool, where the sidelink resource pool is used for sidelink communication between the apparatus 500 and a second terminal device, the configuration information is used to indicate that frequency domain resources of the resource pool include L sub-channels and each of the L sub-channels includes q resource blocks RBs, the L sub-channels include M sub-channels and N sub-channels, the M sub-channels are used by the apparatus 500 to send a PSCCH and/or a PSSCH, the N sub-channels are used by the apparatus 500 to receive a PSFCH from the second terminal device, and there is a correspondence between one of the M sub-channels and one of N·q RBs included in the N sub-channels, where N·q≥M, and L, M, N, and q are all integers greater than or equal to 1.

The transceiver unit 510 is further configured to send a first PSCCH and/or a first PSSCH on a first channel in a slot n, where the first channel includes one or more of the M sub-channels.

The processing unit 520 is configured to determine, based on the correspondence and the first channel, a first RB on which a first PSFCH sent by the second terminal device for the first PSCCH and/or the first PSSCH is received from the second terminal device.

The transceiver unit 510 is further configured to receive the first PSFCH from the second terminal device on the first RB in a slot n+k, where n≥0, k≥1, and both n and k are integers.

In a possible design, the transceiver unit 510 may alternatively be replaced with a receiving unit and/or a sending unit. For example, the transceiver unit 510 may be replaced with a receiving unit when performing a receiving step. For example, the transceiver unit 510 may be replaced with a receiving unit when obtaining the configuration information of the sidelink resource pool. For another example, the transceiver unit 510 may be replaced with a receiving unit when receiving the first PSFCH.

Correspondingly, the transceiver unit 510 may be replaced with a sending unit when performing a sending step. For example, the transceiver unit 510 may be replaced with a sending unit when sending the first PSCCH and/or the first PSSCH.

Herein, the apparatus 500 may be completely corresponding to the first terminal device in the method 100. Corresponding units of the apparatus 500 are respectively configured to perform corresponding operations or processing performed by the first terminal device in the method 100 or embodiments thereof.

For example, the transceiver unit 510 is configured to perform steps, for example, obtain configuration information of a sidelink resource pool, send the first PSCCH and/or the first PSSCH to the second terminal device, and send a second PSCCH to the second terminal device. The processing unit 520 is configured to perform steps, for example, determine, based on the correspondence and the first channel, a first RB for receiving the first PSFCH from the second terminal device, determine a second RB in N·q RBs included in the N sub-channels, determine an index of a second channel, determine a value of k based on the configuration information, and obtain the value of k from the first PSCCH.

Optionally, the transceiver unit 510 may be a transceiver, the transceiver 510 has a sending and/or receiving function, and the transceiver may alternatively be replaced with a receiver and/or a transmitter.

Alternatively, the transceiver unit 510 may be a communication interface. Specifically, the communication interface may include an input interface and/or an output interface.

Optionally, the processing unit 520 may be a processor. Alternatively, the processing unit 520 may be a processing apparatus, and some or all functions of the processing apparatus may be implemented by using software.

In a possible design, some or all functions of the processing apparatus may be implemented by using software. In this case, the processing apparatus may include a memory and a processor. The memory is configured to store a computer program. The processor reads and executes the computer program stored in the memory, to perform steps that are internally implemented by the first terminal device in the method 100 and the embodiments thereof. For example, the foregoing steps performed by the processing unit 510 are performed.

In another possible design, the processing apparatus may be a processor. A memory configured to store a computer program is located outside the processing apparatus. The processor is connected to the memory by using a circuit/wire, and is configured to read and execute the computer program stored in the memory.

In another possible design, some or all functions of the processing apparatus may be implemented by using hardware. In this case, the processing apparatus includes: an input interface circuit, configured to obtain the configuration information; a logic circuit, configured to determine, based on the configuration information, M, N, and a quantity N·q of RBs included in the N sub-channels; and an output interface circuit, configured to output M, N, and N·q.

FIG. 14 is a schematic block diagram of a feedback channel sending apparatus 600 according to this application. The apparatus 600 includes a transceiver unit 610 and a processing unit 620. The apparatus 600 is configured to perform a step performed by the second terminal device in the embodiment shown in FIG. 5, FIG. 6, or FIG. 7.

The transceiver unit 610 is configured to obtain configuration information of a sidelink resource pool, where the sidelink resource pool is used for sidelink communication between a first terminal device and the apparatus 600, the configuration information is used to indicate that frequency domain resources of the resource pool include L sub-channels and each of the L sub-channels includes q resource blocks RBs, the L sub-channels include M sub-channels and N sub-channels, the M sub-channels are used by the first terminal device to send a PSCCH and/or a PSSCH, the N sub-channels are used by the first terminal device to receive a PSFCH from the apparatus 600, and there is a correspondence between one of the M sub-channels and one of N·q RBs included in the N sub-channels, where N·q M, and L, M, N, and q are all integers greater than or equal to 1.

The transceiver unit 610 is further configured to receive a first PSCCH and/or a first PSSCH from the first terminal device on a first channel in a slot n, where the first channel includes one or more of the M sub-channels.

The processing unit 620 is configured to determine, based on the correspondence and the first channel, a first RB on which a first PSFCH is sent for the first PSCCH and/or the first PSSCH, where the first RB belongs to the N·q RBs included in the N sub-channels.

The transceiver unit 610 is further configured to send the first PSFCH to the first terminal device on the first RB in a slot n+k, where n≥0, k≥1, and both n and k are integers.

In a possible design, the transceiver unit 610 may alternatively be replaced with a receiving unit and/or a sending unit. For example, the transceiver unit 610 may be replaced with a receiving unit when performing a receiving step. For example, the transceiver unit 610 may be replaced with a receiving unit when obtaining the configuration information of the sidelink resource pool.

Correspondingly, the transceiver unit 610 may be replaced with a sending unit when performing a sending step. For example, the transceiver unit 610 may be replaced with a sending unit when sending the first PSCCH and/or the first PSSCH. For another example, the transceiver unit 610 may be replaced with a sending unit when sending the first PSFCH.

Herein, the apparatus 600 may be completely corresponding to the second terminal device in the method 100. Corresponding units of the apparatus 600 are respectively configured to perform corresponding operations or processing performed by the second terminal device in the method 100 or embodiments thereof.

For example, the transceiver unit 610 is configured to: receive the first PSCCH and/or the first PSSCH from the first terminal device, send the first PSFCH to the first terminal device, receive a second PSCCH from the first terminal device, and the like.

The processing unit 620 is configured to: determine the first RB on which the first PSFCH for the first PSCCH and/or the first PSSCH is sent to the first terminal device, determine an index of a second channel for receiving the first PSCCH from the first terminal device, determine a value of k based on the configuration information, obtain the value of k from the first PSCCH, or the like.

Optionally, the transceiver unit 610 may be a transceiver, and the transceiver 610 has a sending and/or receiving function. The transceiver 610 may alternatively be replaced with a receiver and/or a transmitter.

Alternatively, the transceiver unit 610 may be a communication interface. Specifically, the communication interface may include an input interface and/or an output interface.

Optionally, the processing unit 620 may be a processor. Alternatively, the processing unit 620 may be a processing apparatus, and some or all functions of the processing apparatus may be implemented by using software.

In a possible design, some or all functions of the processing apparatus may be implemented by using software. In this case, the processing apparatus may include a memory and a processor. The memory is configured to store a computer program. The processor reads and executes the computer program stored in the memory, to perform steps that are internally implemented by the second terminal device in the method 100 and the embodiments thereof. For example, the foregoing steps performed by the processing unit 620 are performed.

In another possible design, the processing apparatus may be a processor. A memory configured to store a computer program is located outside the processing apparatus. The processor is connected to the memory by using a circuit/wire, and is configured to read and execute the computer program stored in the memory.

In another possible design, some or all functions of the processing apparatus may be implemented by using hardware. In this case, the processing apparatus includes: an input interface circuit, configured to obtain the configuration information of the sidelink resource pool; a logic circuit, configured to determine, based on the configuration information, M, N, and a quantity N·q of RBs included in the N sub-channels; and an output interface circuit, configured to output M, N, and N·q.

Optionally, the processing apparatus in this application may be a chip or an integrated circuit. For example, the processing apparatus may be a field programmable gate array (FPGA), an application-specific integrated chip (ASIC), a system on chip (SoC), a central processing unit (CPU), a network processor (NP), a digital signal processing circuit (digital signal processor. DSP), a micro controller unit (MCU), a programmable controller (programmable logic device, PLD), or another integrated chip.

FIG. 15 is a schematic structural diagram of a terminal device according to this application. As shown in FIG. 15, the terminal device 1000 includes a processor 1001 and a transceiver 1002. Optionally, the terminal device 1000 further includes a memory 1003. The processor 1001, the transceiver 1002, and the memory 1003 may communicate with each other through an internal connection path, to transfer a control signal and/or a data signal. The memory 1003 is configured to store a computer program, and the processor 1001 is configured to invoke the computer program from the memory 1003 and run the computer program, to control the transceiver 1002 to receive and send a signal.

Optionally, the terminal device 1000 may further include an antenna 1004, configured to send, by using a radio signal, uplink data or uplink control signaling output by the transceiver 1002.

The processor 1001 and the memory 1003 may be integrated into one processing apparatus, and the processor 1001 is configured to execute program code stored in the memory 1003, to implement the foregoing function. During specific implementation, the memory 1003 may alternatively be integrated into the processor 1001, or may be independent of the processor 1001.

Specifically, the terminal device 1000 may be corresponding to the first terminal device or the second terminal device in the method embodiments of this application. The terminal device 1000 may include units configured to perform steps performed by the first terminal device or the second terminal device in the various method embodiments.

When the terminal device 1000 is corresponding to the first terminal device in the method embodiments, units in the terminal device 1000 are separately configured to implement corresponding procedures performed by the first terminal device in the method 100 and the embodiments thereof.

For example, the transceiver 1002 of the terminal device 1000 is configured to perform step 110 in FIG. 5, the step (step 120) of sending a first PSCCH and/or a first PSSCH, and the step (step 140) of receiving a first PSFCH on a first RB. The processor 1001 is configured to perform step 130 in FIG. 5. Further, the transceiver 1002 is further configured to perform step 302, step 305, and step 310 shown in FIG. 6. The transceiver is further configured to perform the procedure of sending a second PSCCH in step 402 and step 405 shown in FIG. 7. Further, the processor 1001 is further configured to perform the step of determining a second RB, the step of determining an index of a second channel, the step of determining a value of k, and the like in the method embodiments.

When the terminal device 1000 is corresponding to the second terminal device in the method embodiments, units in the terminal device 1000 are separately configured to implement corresponding procedures performed by the second terminal device in the method 100 and the embodiments thereof.

For example, the transceiver 1002 of the terminal device 1000 is configured to perform the step (step 120) of receiving the first PSCCH and/or the first PSSCH from the first terminal device, and the step (step 140) of sending the first PSFCH on the first RB in FIG. 5. The processor 1001 is configured to perform step 130 in FIG. 5. Further, the transceiver 1002 is further configured to perform the step (step 305) of receiving a first PSCCH and/or a first PSSCH, the step (step 306) of blind decoding the first PSCCH and receiving the first PSSCH based on the first PSCCH, and the step (step 310) of sending a first PSFCH on the first RB, that are shown in FIG. 6. The transceiver is further configured to perform the step (step 405) of receiving the second PSCCH on the second RB, step 406, and the like shown in FIG. 7. Further, the processor 1001 is further configured to perform the step of determining a second RB, the step of determining an index of a second channel, the step of determining a value of k, and the like in the method embodiments.

The processor 1001 may be configured to perform an action internally implemented by the first terminal device or the second terminal device in the foregoing method embodiments, and the transceiver 1002 may be configured to perform a sending action or receiving action performed by the first terminal device or the second terminal device in the foregoing method embodiments. For details, refer to the descriptions in the foregoing method embodiments. Details are not described herein again.

Optionally, the terminal device 1000 may further include a power supply 1005, configured to supply power to various components or circuits in the terminal device.

In addition, to make functions of the terminal device more perfect, the terminal device 1000 may further include one or more of an input unit 1006, a display unit 1007, an audio circuit 1008, a camera 1009, a sensor 1010, and the like, and the audio circuit may further include a speaker 10082, a microphone 10084, and the like.

In addition, this application further provides a communication system, including a first terminal device and a second terminal device. Further, the communication system may further include a network device.

This application further provides a computer-readable storage medium. The computer-readable storage medium stores a computer program. When the computer program is executed by a computer, the computer is enabled to perform a step and/or a procedure performed by the first terminal device in any method embodiment.

This application further provides a computer program product. The computer program product includes computer program code. When the computer program code is run on a computer, the computer is enabled to perform a step and/or a procedure performed by the first terminal device in any method embodiment.

This application further provides a chip, and the chip includes a processor. A memory configured to store a computer program is disposed independent of the chip. The processor is configured to execute the computer program stored in the memory, to perform a step and/or a procedure performed by the first terminal device in any method embodiment.

Further, the chip may further include the memory and a communication interface. The communication interface may be an input/output interface, an input/output circuit, or the like.

This application further provides a computer-readable storage medium. The computer-readable storage medium stores a computer program. When the computer program is executed by a computer, the computer is enabled to perform a step and/or a procedure performed by the second terminal device in any method embodiment.

This application further provides a computer program product. The computer program product includes computer program code. When the computer program code is run on a computer, the computer is enabled to perform a step and/or a procedure performed by the second terminal device in any method embodiment.

This application further provides a chip, and the chip includes a processor. A memory configured to store a computer program is disposed independent of the chip. The processor is configured to execute the computer program stored in the memory, to perform a step and/or a procedure performed by the second terminal device in any method embodiment.

Further, the chip may further include the memory and a communication interface. The communication interface may be an input/output interface, an input/output circuit, or the like.

The processor in the embodiments of this application may be an integrated circuit chip, and has a signal processing capability. In an implementation process, the steps in the foregoing method embodiments may be performed by using a hardware integrated logical circuit in the processor, or by using instructions in a form of software. The processor may be a general-purpose processor, a digital signal processor (DSP), an application-specific integrated circuit (application specific integrated circuit. ASIC), a field programmable gate array (FPGA) or another programmable logic device, a discrete gate or transistor logic device, or a discrete hardware component. The general-purpose processor may be a microprocessor, or the processor may be any conventional processor or the like. Steps of the methods disclosed in the embodiments of this application may be directly performed and completed by a hardware encoding processor, or may be performed and completed by a combination of hardware and software modules in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memories in the systems and methods described in this specification include but are not limited to these memories and any memory of another proper type.

A person of ordinary skill in the art may be aware that, in combination with units and algorithm steps in the examples described in the embodiments disclosed in this specification, the embodiments may be implemented by electronic hardware or a combination of computer software and electronic hardware. This specifically depends on specific applications and design constraints of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected based on actual requirements to achieve the objectives of the embodiments of this application.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A feedback channel receiving method, comprising:
obtaining, by a first terminal device, configuration information of a sidelink resource pool, wherein the sidelink resource pool is defined by a network device for sidelink communication between the first terminal device and a second terminal device, wherein the configuration information is used to indicate that frequency domain resources of the sidelink resource pool comprise L sub-channels and each sub-channel of the L sub-channels comprises q resource blocks (RBs), wherein the L sub-channels comprise M sub-channels and N sub-channels, wherein the M sub-channels are used by the first terminal device to send at least one of a physical sidelink control channel (PSCCH) or a physical sidelink shared channel (PSSCH), wherein the N sub-channels are used by the first terminal device to receive a physical sidelink feedback channel (PSFCH) from the second terminal device, wherein there is a correspondence between one of the M sub-channels and one of N·q RBs comprised in the N sub-channels, wherein N·q≥M, wherein L, M, N, and q are all integers greater than or equal to 1, wherein L, q, M, and N satisfy N=⌈L/(1+q)⌉, L=M+N, and wherein ⌈ ⌉ represents rounding up;

sending, by the first terminal device, at least one of a first PSCCH or a first PSSCH on a first channel in a slot n, wherein the first channel comprises one or more of the M sub-channels;

determining, by the first terminal device based on the correspondence and the first channel, a first RB on which a first PSFCH sent by the second terminal device for at least one of the first PSCCH or the first PSSCH is received from the second terminal device, wherein the first RB belongs to the N·q RBs comprised in the N sub-channels; and receiving, by the first terminal device, the first PSFCH from the second terminal device on the first RB in a slot n+k, wherein n≥0, k≥1, and wherein both n and k are integers.

2. The method according to claim 1, wherein sending, by the first terminal device, at least one of the first PSCCH or the first PSSCH on the first channel comprises:

sending, by the first terminal device, at least one of the first PSCCH or the first PSSCH on the first channel scheduled by the network device; or sending, by the first terminal device, at least one of the first PSCCH or the first PSSCH on the first channel that is autonomously selected.

3. The method according to claim 1, wherein the correspondence between the one of the M sub-channels and the one of N·q RBs comprised in the N sub-channels comprises:

an $m^{th}$ sub-channel in the M sub-channels corresponding to an $m^{th}$ RB in the N·q RBs comprised in the N sub-channels, wherein 1≤m≤M, and wherein m is an integer.

4. The method according to claim 1, wherein the method further comprises:

sending, by the first terminal device, a second PSCCH on a second RB, wherein the second PSCCH is not used to schedule a PSSCH, or the second PSCCH and a corresponding PSSCH are located in different slots, and wherein the second RB is an RB that is in the N·q RBs comprised in the N sub-channels and that is other than an RB corresponding to one of the M sub-channels.

5. The method according to claim 1, wherein sending, by the first terminal device, at least one of the first PSCCH or the first PSSCH on the first channel in the slot n comprises:

determining, by the first terminal device, an index of a second channel on which the first PSCCH is located, wherein the second channel is one of one or more sub-channels comprised in the first channel; and sending, by the first terminal device, the first PSCCH to the second terminal device on the second channel.

6. The method according to claim 5, wherein the first terminal device determines that the index $n_{subCH}^{PSCCH}$ of the second channel on which the first PSCCH is located satisfies the following formula:

$$n_{subCH}^{PSCCH} = n_{subCH}^{start} + \lfloor (K_{subCH}-1)/2 \rfloor,$$

wherein $n_{subCH}^{start}$ is a start index of the one or more sub-channels comprised in the first channel, start and wherein $K_{subCH}$ is a quantity of sub-channels comprised in the first channel.

7. The method according to claim 1, wherein the configuration information comprises a value of k, and wherein the method further comprises:

determining, by the first terminal device, the value of k based on the configuration information.

8. The method according to claim 7, wherein the first PSCCH carries information indicating the value of k.

9. A feedback channel sending method, comprising:

obtaining, by a second terminal device, configuration information of a sidelink resource pool, wherein the sidelink resource pool is defined by a network device for sidelink communication between a first terminal device and the second terminal device, wherein the configuration information is used to indicate that frequency domain resources of the sidelink resource pool comprise L sub-channels and each sub-channel of the L sub-channels comprises q resource blocks (RBs), wherein the L sub-channels comprise M sub-channels and N sub-channels, wherein the M sub-channels are used by the first terminal device to send at least one of a physical sidelink control channel (PSCCH) or a physical sidelink shared channel (PSSCH), wherein the N sub-channels are used by the first terminal device to receive a physical sidelink feedback channel PSFCH from the second terminal device, wherein there is a correspondence between one of the M sub-channels and one of N·q RBs comprised in the N sub-channels, wherein N·q≥M, wherein L, M, N, and q are all integers greater than or equal to 1, wherein L, q, M, and N satisfy N=⌈L/(1+q)⌉, L=M+N, and wherein ⌈ ⌉ represents rounding up;

receiving, by the second terminal device, at least one of a first PSCCH or a first PSSCH from the first terminal device on a first channel in a slot n, wherein the first channel comprises one or more of the M sub-channels;

determining, by the second terminal device based on the correspondence and the first channel, a first RB on which a first PSFCH is sent for at least one of the first PSCCH or the first PSSCH, wherein the first RB belongs to the N·q RBs comprised in the N sub-channels; and sending, by the second terminal device, the first PSFCH to the first terminal device on the first RB in a slot n+k, wherein n≥0, k≥1, and wherein both n and k are integers.

10. The method according to claim 9, wherein the correspondence between the one of the M sub-channels and the one of N·q RBs comprised in the N sub-channels comprises:

an $m^{th}$ sub-channel in the M sub-channels corresponding to an $m^{th}$ RB in the N·q RBs comprised in the N sub-channels, wherein 1≤m≤M, and wherein m is an integer.

11. The method according to claim 9, wherein the method further comprises:

receiving, by the second terminal device, a second PSCCH from the first terminal device on a second RB, wherein the second PSCCH is not used to schedule a PSSCH, or the second PSCCH and a corresponding PSSCH are located in different slots, and wherein the second RB is an RB that is in the N·q RBs comprised in the N sub-channels and that is other than an RB corresponding to one of the M sub-channels.

12. The method according to claim 9, wherein receiving, by the second terminal device, at least one of the first PSCCH or the first PSSCH from the first terminal device on the first channel comprises:
   determining, by the second terminal device, an index of a second channel on which the first PSCCH is located, wherein the second channel is one of one or more sub-channels comprised in the first channel; and
   receiving, by the second terminal device, the first PSCCH from the first terminal device on the second channel.

13. The method according to claim 12, wherein the second terminal device determines that the index $n_{subCH}^{PSCCH}$ of the second channel on which the first PSCCH is located satisfies the following formula:

$$n_{subCH}^{PSCCH} = n_{subCH}^{start} + \lfloor (K_{subCH}-1)/2 \rfloor,$$

wherein $n_{subCH}^{start}$ is a start index of the one or more sub-channels comprised in the first channel, and wherein $K_{subCH}$ is a quantity of sub-channels comprised in the first channel.

14. The method according to claim 9, wherein the second terminal device determines a value of k in the following manner:
   determining, by the second terminal device, the value of k based on the configuration information, wherein the configuration information comprises the value of k; or
   determining, by the second terminal device, the value of k based on the first PSCCH, wherein the first PSCCH carries information indicating the value of k.

15. A feedback channel receiving apparatus, comprising:
   a transceiver, the transceiver configured to:
      obtain configuration information of a sidelink resource pool, wherein the sidelink resource pool is defined by a network device for sidelink communication between the apparatus and a second terminal device, wherein the configuration information is used to indicate that frequency domain resources of the sidelink resource pool comprise L sub-channels and each sub-channel of the L sub-channels comprises q resource blocks (RBs), wherein the L sub-channels comprise M sub-channels and N sub-channels, wherein the M sub-channels are used by the apparatus to send at least one of a physical sidelink control channel (PSCCH) or a physical sidelink shared channel (PSSCH), wherein the N sub-channels are used by the apparatus to receive a physical sidelink feedback channel PSFCH from the second terminal device, wherein there is a correspondence between one of the M sub-channels and one of N·q RBs comprised in the N sub-channels, wherein N·q≥M, wherein L, M, N, and q are all integers greater than or equal to 1, wherein L, q, M, and N satisfy $N=\lceil L/(1+q) \rceil$, L=M+N, and wherein $\lceil\ \rceil$ represents rounding up;
      send at least one of a first PSCCH or a first PSSCH on a first channel in a slot n, wherein the first channel comprises one or more of the M sub-channels;
   at least one processor; and
   one or more memories coupled to the at least one processor and storing programming instructions for execution by the at least one processor to determine, based on the correspondence and the first channel, a first RB on which a first PSFCH sent by the second terminal device for at least one of the first PSCCH or the first PSSCH is received from the second terminal device, wherein the first RB belongs to the N·q RBs comprised in the N sub-channels, and wherein:
      the transceiver is further configured to receive the first PSFCH from the second terminal device on the first RB in a slot n+k, wherein n≥0, k≥1, and wherein both n and k are integers.

16. The apparatus according to claim 15, wherein the transceiver is further configured to:
   send at least one of the first PSCCH or the first PSSCH on the first channel scheduled by the network device; or
   send at least one of the first PSCCH or the first PSSCH on the first channel autonomously selected by the at least one processor.

17. The apparatus according to claim 15, wherein the correspondence between the one of the M sub-channels and the one of N·q RBs comprised in the N sub-channels comprises:
   an $m^{th}$ sub-channel in the M sub-channels corresponding to an $m^{th}$ RB in the N·q RBs comprised in the N sub-channels, wherein 1≤m≤M, and wherein m is an integer.

18. The apparatus according to claim 15, wherein the transceiver is further configured to:
   send a second PSCCH on a second RB, wherein the second PSCCH is not used to schedule a PSSCH, or the second PSCCH and a corresponding PSSCH are located in different slots, and wherein the second RB is an RB that is in the N·q RBs comprised in the N sub-channels and that is other than an RB corresponding to one of the M sub-channels.

19. The apparatus according to claim 15, wherein the configuration information comprises a value of k, and wherein the programming instructions are for execution by the at least one processor to:
   determine the value of k based on the configuration information.

20. The apparatus according to claim 19, wherein the first PSCCH carries information indicating the value of k.

* * * * *

UNITED STATES PATENT AND TRADEMARK OFFICE
CERTIFICATE OF CORRECTION

PATENT NO. : 12,137,398 B2
APPLICATION NO. : 17/363425
DATED : November 5, 2024
INVENTOR(S) : Hongjia Su et al.

Page 1 of 1

It is certified that error appears in the above-identified patent and that said Letters Patent is hereby corrected as shown below:

In the Claims

In Column 32, In Line 8, In Claim 6, delete "start and" and insert -- and --.

Signed and Sealed this
Fourth Day of March, 2025

Coke Morgan Stewart
*Acting Director of the United States Patent and Trademark Office*